US009442765B2

(12) United States Patent
Matsumoto et al.

(10) Patent No.: US 9,442,765 B2
(45) Date of Patent: Sep. 13, 2016

(54) IDENTIFYING SHARED PHYSICAL STORAGE RESOURCES HAVING POSSIBILITY TO BE SIMULTANEOUSLY USED BY TWO JOBS WHEN REACHING A HIGH LOAD

(71) Applicant: Hitachi, Ltd., Tokyo (JP)

(72) Inventors: Anna Matsumoto, Tokyo (JP); Jun Nakajima, Tokyo (JP); Satoshi Kaneko, Tokyo (JP); Kyoko Miwa, Tokyo (JP); Yukinori Sakashita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/425,689

(22) PCT Filed: Apr. 12, 2013

(86) PCT No.: PCT/JP2013/061090
§ 371 (c)(1),
(2) Date: Mar. 4, 2015

(87) PCT Pub. No.: WO2014/167716
PCT Pub. Date: Oct. 16, 2014

(65) Prior Publication Data
US 2015/0205639 A1    Jul. 23, 2015

(51) Int. Cl.
*G06F 9/50* (2006.01)
*G06F 11/30* (2006.01)
*G06F 3/06* (2006.01)

(52) U.S. Cl.
CPC ........... *G06F 9/5016* (2013.01); *G06F 3/0604* (2013.01); *G06F 3/0631* (2013.01); *G06F 3/0685* (2013.01); *G06F 11/30* (2013.01); *G06F 2206/1008* (2013.01)

(58) Field of Classification Search
None
See application file for complete search history.

(56) References Cited

U.S. PATENT DOCUMENTS

| | | | | |
|---|---|---|---|---|
| 6,016,503 A | * | 1/2000 | Overby, Jr. | ................ G06F 9/50 370/229 |
| 6,918,006 B1 | * | 7/2005 | Archibald, Jr. | ........ G06F 3/0611 710/6 |
| 8,190,588 B1 | * | 5/2012 | Gupta | ................. G06F 11/1662 707/615 |
| 8,190,593 B1 | * | 5/2012 | Dean | ................. G06F 17/30864 707/707 |

(Continued)

FOREIGN PATENT DOCUMENTS

| | | |
|---|---|---|
| JP | 2007-72988 A | 3/2007 |
| JP | 2008-152663 A | 7/2008 |

(Continued)

*Primary Examiner* — Benjamin Wu
(74) *Attorney, Agent, or Firm* — Mattingly & Malur, PC

(57) ABSTRACT

An exemplary management system identifies, based on first information indicating a job net defining an execution order of jobs executed by the host computer, jobs having possibility to be executed simultaneously at the job net. The management system identifies, based on second information indicating an execution content of each of the jobs, storage areas at the host computer for storing data of the jobs having possibility to be executed simultaneously. The management system identifies, based on third information indicating an allocation relation between the data storage areas of the host computer and resources of the storage apparatus, a resource of the storage apparatus allocated to each of the identified storage areas. The management system determines a physical resource of the storage apparatus, allocated to at least two of the storage areas of the identified storage areas, has possibility to be used simultaneously by at least two jobs.

15 Claims, 19 Drawing Sheets

(56) References Cited

U.S. PATENT DOCUMENTS

| | | | | |
|---|---|---|---|---|
| 8,230,188 B2* | 7/2012 | Umezuki | ............ | G06F 11/2087 711/161 |
| 8,331,234 B1* | 12/2012 | Newton | ................ | H04L 43/026 370/231 |
| 8,374,929 B1* | 2/2013 | Lappas | .................. | G06Q 10/06 370/219 |
| 8,418,181 B1* | 4/2013 | Sirota | ..................... | H04L 67/00 709/201 |
| 8,893,146 B2* | 11/2014 | Muppirala | .................... | 709/224 |
| 2003/0187998 A1* | 10/2003 | Petit | ...................... | H04L 63/102 709/229 |
| 2006/0080486 A1* | 4/2006 | Yan | ....................... | G06F 9/5038 710/123 |
| 2006/0218364 A1* | 9/2006 | Kitamura | ............... | G06F 3/0605 711/162 |
| 2007/0186064 A1* | 8/2007 | Roh | ..................... | G11B 27/034 711/159 |
| 2008/0183871 A1* | 7/2008 | Ogawa | ................... | G06F 3/061 709/226 |
| 2008/0229320 A1* | 9/2008 | Ueda | ..................... | G06F 9/5038 718/104 |
| 2009/0119529 A1* | 5/2009 | Kono | .................... | G06F 1/3221 713/324 |
| 2010/0332696 A1* | 12/2010 | Muppirala | ........... | G06F 13/1642 710/39 |
| 2011/0231551 A1* | 9/2011 | Hassan | ............... | H04L 12/1421 709/226 |
| 2012/0278512 A1* | 11/2012 | Alatorre | ............... | G06F 3/0605 710/33 |
| 2014/0068621 A1* | 3/2014 | Sitaraman | ............... | G06F 9/505 718/102 |

FOREIGN PATENT DOCUMENTS

| | | |
|---|---|---|
| JP | 2008-226181 A | 9/2008 |
| JP | 2009-53921 A | 3/2009 |
| JP | 2009-282754 A | 12/2009 |
| JP | 2010-231636 A | 10/2010 |
| JP | 2011-100263 A | 5/2011 |
| JP | 2011-215677 A | 10/2011 |
| WO | 2012/169027 A1 | 12/2012 |

\* cited by examiner

| JOB INFORMATION TABLE | | | 810 |
|---|---|---|---|
| JOB | EXECUTION APPARATUS | EXECUTION FILE | EXECUTION ARGUMENT |
| A | HOST 1 | File1.exe | Null |
| B | HOST 1 | File2-1.exe | Null |
| B | HOST 1 | File2-2.exe | Null |
| C | HOST 1 | File3.exe | Null |
| D | HOST 1 | File4.exe | active |
| E | HOST 1 | File5.exe | data31.mdb |
| F | HOST 1 | File6.-1exe | true |
| F | HOST 1 | File6-2.exe | Null |
| ... | ... | ... | ... |
| 1310 | 1320 | 1330 | 1340 |

*Fig. 8*

| JOB NET INFORMATION TABLE | | 920 |
|---|---|---|
| JOB | DATA STORAGE AREA | EXECUTION COMMENCEMENT CONDITION |
| A | C:¥data¥com¥001¥data1.mdb | Null |
| B | C:¥data¥com¥001¥data2.mdb | A |
| B | C:¥data¥com¥002¥data2-1.mdb | A |
| C | C:¥data¥01¥data1¥data1_1.exp | B |
| D | C:¥db¥db1¥1_a¥01.mdf | A |
| E | C:¥data¥com¥003¥data31.mdb | D |
| F | C:¥db¥db2¥2_c¥02.mdf | C, E |
| F | C:¥db¥db2¥3_g¥03.mdf | C, E |
| ... | ... | ... |

| RESOURCE INFORMATION TABLE | | | | 750 |
|---|---|---|---|---|
| VOLUME | STORAGE APPARATUS | PORT | ARRAY | VOLUME TYPE |
| VOL 1 | STORAGE A | PORT 1 | ARRAY1 | VVOL |
| VOL 2 | STORAGE A | PORT 2 | ARRAY1 | VVOL |
| VOL 3 | STORAGE A | PORT 2 | ARRAY4 | VVOL |
| VOL 4 | STORAGE A | PORT 3 | ARRAY7 | VVOL |
| VOL 10 | STORAGE A | PORT 9 | ARRAY3 | VVOL |
| VOL 20 | STORAGE B | PORT 10 | ARRAY5 | - |
| VOL 21 | STORAGE A | PORT 9 | ARRAY20 | VVOL |
| VOL100 | STORAGE A | - | ARRAY2 | POOL VOL |
| ... | ... | ... | ... | ... |
| | 1610 | 1620 | 1630 | 1640 | 1645 |

| POOL | UTILIZATION CAPACITY PER TIER | | | HOST | MOUNT DESTINATION OF HOST COMPUTER |
|---|---|---|---|---|---|
| | TIER 0 | TIER 1 | TIER 2 | | |
| POOL 1 | 20GB | 10GB | 0GB | HOST 1 | C:¥data¥com¥001¥ |
| POOL 1 | 0GB | 20GB | 50GB | HOST 1 | C:¥data¥com¥003¥ |
| POOL 3 | 5GB | 20GB | 50GB | HOST 1 | C:¥db¥db2¥2_c¥ |
| POOL 4 | 15GB | 0GB | 0GB | HOST 1 | C:¥data¥com¥002¥ |
| POOL 7 | 50GB | - | - | HOST 1 | C:¥data¥01¥data1¥ |
| - | - | - | - | HOST 2 | D:¥data¥ |
| POOL 5 | 25GB | 0GB | 0GB | HOST 1 | C:¥db¥db1¥1_a¥ |
| POOL 1 | - | - | - | - | - |
| ... | ... | ... | ... | ... | ... |
| 1650 | 1660 | 1670 | 1680 | 1690 | 1691 |

*Fig. 10*

| SIMULTANEOUSLY EXECUTED JOB INFORMATION TABLE | 830 |
|---|---|
| JOB | SIMULTANEOUSLY EXECUTED JOB |
| B | D, E |
| C | D, E |
| D | B, C |
| E | B, C |
| H | I |
| I | H |

| COMMAND LOAD INFORMATION TABLE | 870 |
|---|---|
| COMMAND | IOPS |
| COPY | 100 |
| EXTRACT | 500 |
| ... | ... |

| RESOURCE MONITORING INFORMATION TABLE | | | | | 770 |
|---|---|---|---|---|---|
| VOLUME | STORAGE APPARATUS | DATA AND TIME | UTILIZATION CAPACITY PER TIER | | |
| | | | TIER 0 | TIER 1 | TIER 2 |
| VOL 1 | STORAGE A | 2013/1/15 9:00 | 20GB | 10GB | 0GB |
| VOL 2 | STORAGE A | 2013/1/15 9:00 | 0GB | 20GB | 50GB |
| VOL 10 | STORAGE B | 2013/1/15 9:00 | 50GB | - | - |
| ... | ... | ... | ... | ... | ... |
| VOL1 | STORAGE A | 2013/1/15 10:00 | 10GB | 20GB | 0GB |
| VOL 2 | STORAGE A | 2013/1/15 10:00 | 0GB | 30GB | 40GB |
| ... | ... | ... | ... | ... | ... |

SETTINGS FOR NOTIFICATION POLICY REGARDING
RESULT OF CONFIGURATION CHECK PRIOR TO JOB NET

<EXECUTION OPTION> 2110

- ◉ NOTIFY AFTER COMPLETION OF EXAMINATION FOR ALL JOBS WITHIN JOB NET
- ○ NOTIFY ONLY CONCERNING PHYSICAL RESOURCE HAVING HIGH I/O LOAD AMONG PHYSICAL RESOURCES HAVING POSSIBILITY TO BE USED SIMULTANEOUSLY
- ○ NOTIFY WHENEVER THERE IS PHYSICAL RESOURCE HAVING POSSIBILITY TO BE USED SIMULTANEOUSLY

<NOTIFICATION OPTION> 2120

- ◉ DO NOT NOTIFY STORAGE ADMINISTRATOR AUTOMATICALLY
- ○ NOTIFY STORAGE ADMINISTRATOR WHENEVER THERE IS USABLE RESOURCE
- ○ ALWAYS NOTIFY STORAGE ADMINISTRATOR

<EXECUTION TIMING> 2130

- ◉ WHEN CREATING JOB NET
- ○ WHEN EXECUTING JOB NET      2140
  [ 3 ] HOUR(S) PRIOR

<LOAD THRESHOLD> 2150

- ○ NO
- ◉ YES
  2160

| | | |
  |---|---|---|
  | PORT 8GB : | 5000 | IOPS |
  | PORT 16GB : | 10000 | IOPS |
  | SSD : | 3500 | IOPS |
  | SAS : | 1000 | IOPS |
  | SATA : | 400 | IOPS |

2170
  [ RETURN TO DEFAULT SETTING ]

Fig. 19

RESULT OF CONFIGURATION CHECK PRIOR TO JOB NET

| SELECT | NOTIFI-CATION DATE AND TIME | JOB NET ID | SCHEDULED DATE AND TIME FOR EXECUTION | CONTENT | REASON |
|---|---|---|---|---|---|
| ✓ | 2013/1/31 21:00 | 001 | 2013/2/1 9:00 | JOB NET DELAY POSSIBLE | JOB B AND JOB E POSSIBLY ACCESSING THE SAME PHYSICAL STORAGE RESOURCE SIMULTANEOUSLY |
| ✓ | 2013/2/1 0:00 | | 2013/2/1 12:00 | JOB NET FAIL POSSIBLE | JOB C AND JOB D POSSIBLY USING THE SAME PHYSICAL PATH SIMULTANEOUSLY |

[NOTIFY STORAGE ADMINISTRATOR]

Fig. 20

IDENTIFYING SHARED PHYSICAL STORAGE RESOURCES HAVING POSSIBILITY TO BE SIMULTANEOUSLY USED BY TWO JOBS WHEN REACHING A HIGH LOAD

BACKGROUND

The present invention is related to management of a computer system including a storage apparatus.

In an environment where multiple computer resources and storage resources are included at current computer systems, various duties are processed online. With such computer systems, a large amount of data processed online are analyzed, and activities to let information having add value reflect on business are thriving. In such environment, a job net system operable to perform a data analysis process at once is widely utilized.

A job net indicates an execution order and a flow thereof for multiple jobs. The job net is operable to increase an operating ratio of computer resources by changing a utility form of a server depending on time period such that online operations are processed preferentially during the day while data analyses are processed preferentially at night.

As a method to increase the operating ratio, a technique to carry out a parallel execution by allocating a computer resource of a server per job net is known (Patent Document 1). Further, a technique to determine whether or not multiple jobs may be carried out in the parallel manner by detecting duplication of data which are the target of the jobs is known (Patent Document 2).

Patent Document 1: JP2008-226181 A
Patent Document 2: JP2011-100263 A

SUMMARY

In a system in which a plurality of jobs are executed, there is a possibility that multiple jobs which are executed simultaneously may access a physical storage resource within the same storage apparatus. For example, when data from various data labels are stored at the physical storage resource of the same storage apparatus, there is a possibility that a load is concentrated at a single physical storage resource even when multiple jobs each having a different label for an access destination are executed simultaneously.

Therefore, when executing multiple jobs which utilize a storage apparatus, it is desirable to apply a technique which is operable to inform a user upon determining whether the multiple jobs access the same physical resource simultaneously.

An aspect of the present invention is a management system arranged to a computer system including a host computer and a storage apparatus. The management system includes a processor, a memory, and an output device. The memory retains a first information indicating information on a job net defining an execution order of a plurality of jobs executed by the host computer. The memory retains a second information indicating an execution content of each of the plurality of jobs. The memory retains a third information indicating an allocation relation between a plurality of data storage areas of the host computer and a plurality of resources of the storage apparatus. The processor identifies, based on the first information, the plurality of jobs having a possibility to be executed simultaneously at the job net. The processor identifies, based on the second information, a plurality of storage areas at the host computer for storing therein data of the plurality of jobs having a possibility to be executed simultaneously. The processor identifies, based on the third information, a resource of the storage apparatus allocated to each of the identified storage area. The processor determines a physical resource of the storage apparatus, allocated to at least two of the storage areas of the plurality of identified storage areas, is the physical resource having a possibility to be used simultaneously by at least two jobs. The processor outputs the determined result to the output device.

According to one embodiment of the present invention, it is possible to appropriately determine whether there is a possibility that multiple jobs simultaneously access the same physical resource and a load is concentrated when executing multiple jobs which utilize a storage apparatus.

BRIEF DESCRIPTION OF DRAWINGS

FIG. 8 illustrates an example of a configuration of a job information table according to the present embodiment.

FIG. 9 illustrates an example of a configuration of a job net information table according to the present embodiment.

FIG. 10 illustrates an example of a configuration of a resource information table according to the present embodiment.

FIG. 11 illustrates an example of a configuration of a simultaneously executed job information table according to the present embodiment.

FIG. 12 illustrates an example of a configuration of a command load information table according to the present embodiment.

FIG. 13 illustrates an example of a configuration of a resource monitoring information table according to the present embodiment.

FIG. 19 illustrates an example of a screen to set an execution policy for the simultaneously used resource identification program according to the present embodiment.

FIG. 20 illustrates an example of a screen indicating a notification result of the simultaneously used resource identification program according to the present embodiment.

DETAILED DESCRIPTION OF THE EMBODIMENTS

Hereinafter, embodiments of this invention will be described with reference to the accompanying drawings. It should be noted that this invention is not limited to the examples described hereinafter.

In the following description, descriptions may be provided with subjects of "program" but such descriptions can be replaced by those having subjects of "processor" because a program is executed by a processor (Central Processing Unit (CPU), for example) to perform predetermined processing using computer resources ((a memory, for example) and/or a communication port (communication control device)). In the following description, information in the embodiments will be expressed "aaa table" and the like; however, the information may be expressed in a data structure other than the table, list, DB, queue and the like.

A job net will be described. The job net is a scheduler arranged to define an order for a job such as data management and/or data processing with respect to data which is handled by a host computer. A computer executes a plurality of jobs in accordance with the definition of the job net.

A job defines, for example, a file to execute, an argument of an operation command for executing an operation, a data storage area for target data in the host computer, or the like. The job net defines a condition for an execution for each job with respect to a plurality of jobs. There is no particular rule concerning an item which may be defined by the job net. That which is defined by the job net depends, in accordance with software arranged to create and manage a job, on information necessary to execute the job net. The job net defines at least an order of execution for a job.

Figure 1:
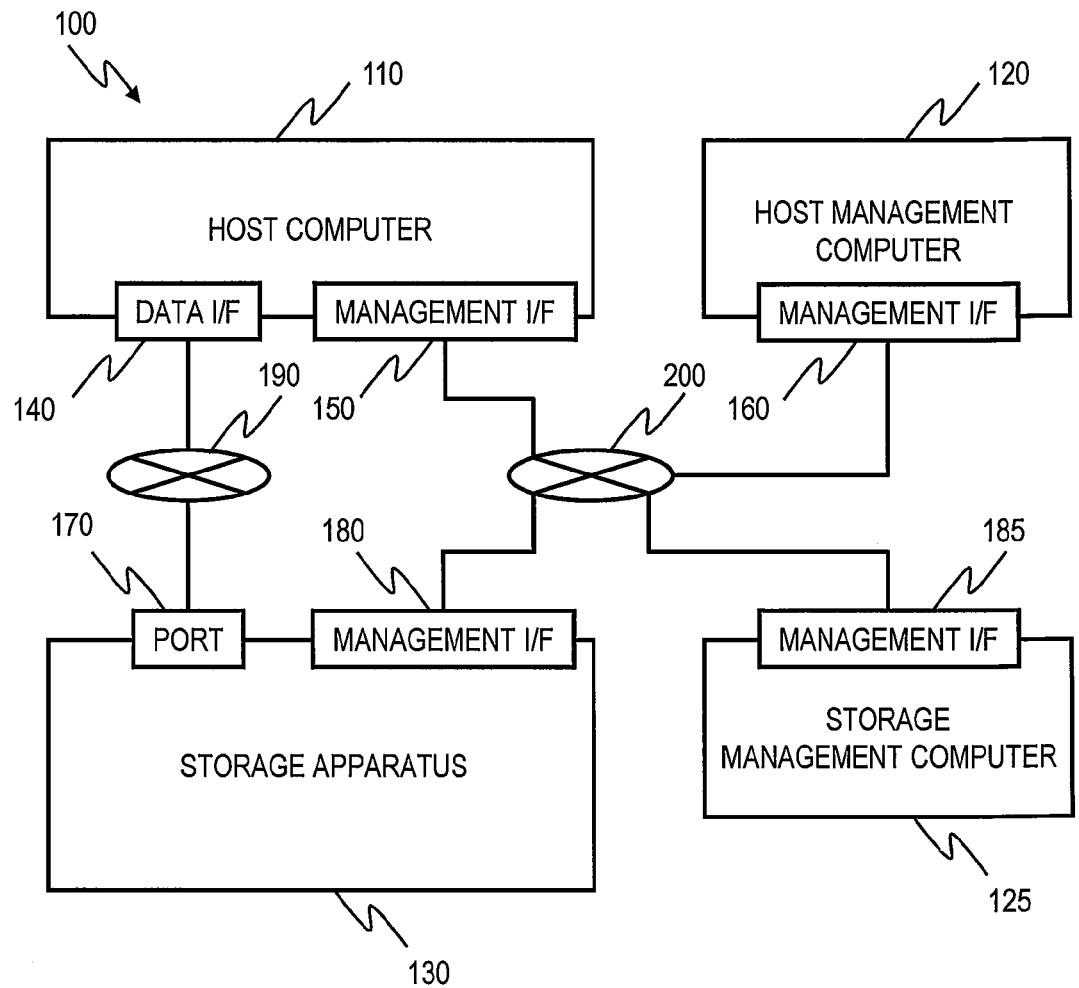
FIG. 1 schematically illustrates an example of a configuration of hardware of a computer system according to a present embodiment.

Hereinafter, a present embodiment will be described. FIG. 1 schematically illustrates an example of a configuration of a computer system 100 according to the present embodiment. The computer system 100 includes a host computer 110, a host management computer 120, a storage management computer 125, and a storage system. The storage system includes a storage apparatus 130. Details concerning each apparatus will be described below.

Note that in order to simplify the description, FIG. 1 illustrates a configuration in a case where the computer system includes one host computer 110, one host management computer 120, one storage management computer 125, and, as a storage system, one storage apparatus 130. The computer system 100 is operable to include a plurality of host computers 110, a plurality of host management computers 120, and a plurality of storage management computers 125. The storage system is operable to include a plurality of storage apparatuses 130.

Although the management system of the present computer system 100 includes one host management computer 120, and one storage management computer 125, the number of computers included in the management system is not limited thereto. The host management computer 120 and the storage management computer 125 may be the same computer. The host management computer 120 and the storage management computer 125 may be managed by a third computer.

A management I/F (Inter Face) 150 of the host computer 110, a management I/F 160 of the host management computer 120, a management I/F 185 of the storage management computer 125, and a management I/F 180 of the storage apparatus 130 are connected via a management network 200 (for example, LAN (Local Area Network)).

By this, the host management computer 120 and the storage management computer 125 are operable to communicate with the host computer 110 and the storage apparatus 130, also, the host management computer 120 and the storage management computer 125 are operable to communicate mutually. When the management network 200 is LAN, each management I/Fs 150, 160, 180 and 185 are, for example, LAN card.

At least one data I/F 140 of the host computer 110 and at least one communication port 170 of the storage apparatus 130 are connected via a data communication network 190 (for example, SAN (Storage Area Network)). By this, the host computer 110 and the storage apparatus 130 are operable to communicate mutually. When the data network 190 is SAN, the data I/Fs 140 and 170 are, for example, HBA (Host Bus Adapter).

Figure 2:
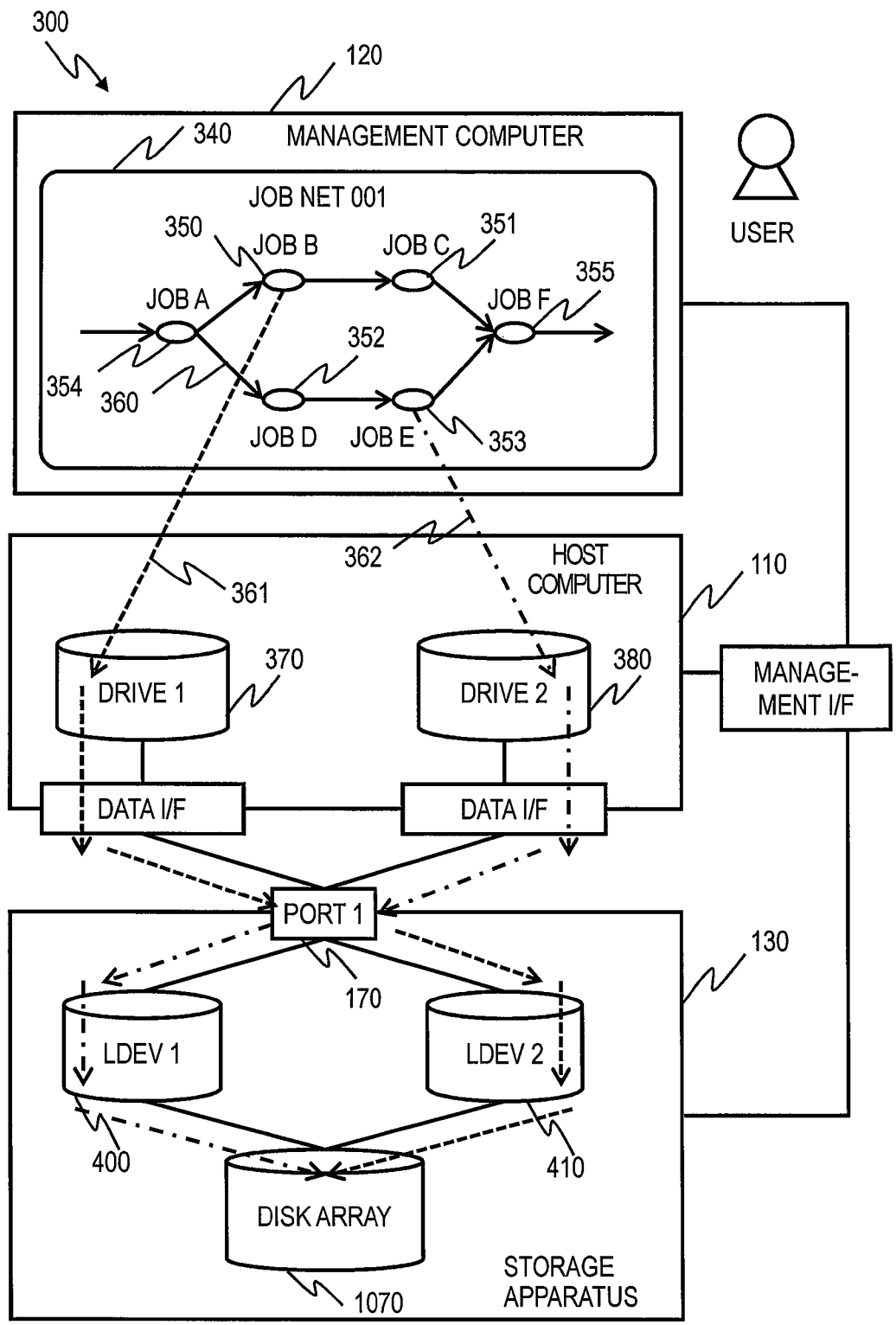
FIG. 2 schematically illustrates an example of a flow of a process of the computer system according to the present embodiment.

FIG. 2 is a schematic diagram illustrating a flow of a process of the computer system 100. The storage apparatus 130 includes a communication port 170, two logical volumes (logical storage resources) 400 and 401 indicated as "LDEV1" and "LDEV2," and one physical storage resource (disk array is one such example) 1070.

The two logical volumes 400 and 410 are created based on the physical storage resource 1070, where a physical storage area of the physical storage resource 1070 is allocated to the logical volumes 400 and 410. The two logical volumes 400 and 410 each have an identifier different from one another where each identifier may be independently allocated to the host computer 110.

The storage apparatus 130 provides the two logical volumes 400 and 410 to the host computer 110. The logical volume 400 indicated as the "LDEV1" is connected to the data interface of a host computer 310 via the communication port 170 indicated as "Port 1," and allocated to a data storage area 370 indicated as "Drive 1" at the host computer 110.

The logical volume 410 indicated as the "LDEV2" is connected to the data interface of the host computer 310 via the communication port 170 indicated as the "Port 1," and allocated to a storage area 380 indicated at "Drive 2" at the host computer 110.

The host management computer 120 includes a job net 340. A user is operable to define, via a user interface of the host management computer 120, the job net 340 indicated, for example, as "job net 001," and execute the job net 340 at a designated time.

FIG. 2 schematically illustrates an example of a configuration of the job net 340. For example, the job net 340 includes 6 jobs, from a job 350 to a job 355, and a correlation thereof. The job 350 to job 355 each include information indicated in a job information table 810, which will be described below, in FIG. 8, and information of an execution file.

An arrow connected between jobs (only one arrow connecting a job 354 (job A) and a job 352 (job D) is indicated as 360) indicates correlations between the jobs, and that when one job (job A) is completed a next job (job D) starts to be executed. For example, a job net information table 920, which will be described below, in FIG. 9 indicates information of the job net 340 which includes the correlations between jobs. As will be described below, a simultaneously executed job information table 840, which will be described below, in FIG. 11 is created from the correlations between jobs.

With reference to FIG. 2, a comparison of physical resources which are the target of each job of the job net 340 will be described below. The job 350 (job B) refers to the data storage area 370, and becomes allocated with the logical volume 400. As indicated with an I/O route 361, the communication port 170 is allocated as a physical resource to the data storage area 370, and the physical storage resource (disk array is one such example) 1070 is allocated to the logical volume 400.

The job 353 (job E) refers to the data storage area 380, and becomes allocated with the logical volume 410. As indicated with an I/O route 362, the communication port 170 is allocated as a physical resource to the data storage area 380, and the physical storage resource 1070 is allocated to the logical volume 410.

When the job 350 and the job 353 are executed simultaneously, there is a possibility that an I/O load from the job 350 and the job 353 may be concentrated on the communication port 170 and the physical storage resource 1070, and an execution time of the job 350 and the job 353 may extend.

Thus, the storage management computer 125 detects the above stated possibility and notifies a user at a time designated via the job net 340 or a certain amount of time prior to the designated time. By this, the user is operable to, before a job net is executed, become aware of and address a possibility of the execution time of the job net being extended, and prevent such extension or failure of the job net.

Figure 3:
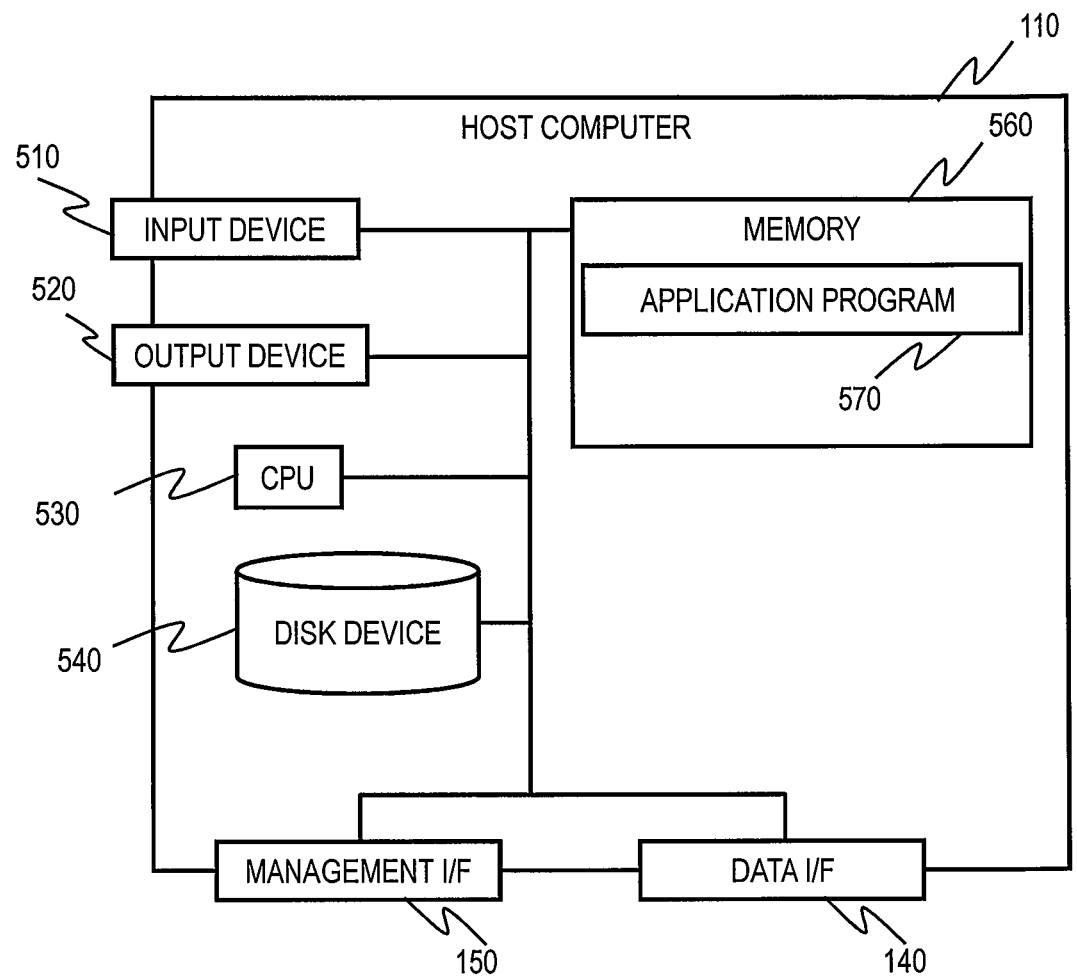
FIG. 3 illustrates an example of a configuration of a host computer according to the present embodiment.

FIG. 3 to FIG. 6 each illustrate an example of a configuration of an apparatus included at the computer system arranged to provide above mentioned functions. FIG. 3 illustrates an example of a configuration of the host computer 110. The host computer 110 is a computer arranged to issue an I/O command. The host computer 110 includes an input device 510, an output device 520, a processor 530 (noted as CPU in the drawing), a disk device 540, a memory 560, a management I/F 150, and at least one data I/F 140.

The input device 510 is a device arranged for a user to input information to the host computer 110. The input device 510 is, for example, a key board, a pointing device, a switch, a touch panel, a microphone, or the like. The output device 520 is a device arranged for the host computer 500 to output information to the user. The output device 520 is, for example, a monitor display, a speaker, a printer, or the like.

The processor 530 controls, in accordance with a program and/or an operation parameter stored at the memory 560, an operation of the host computer 110 in order to implement each type of function which will be described below. The disk device 540 is a physical storage device. The disk device 540 is, for example, an HDD (Hard Disk Drive), an SSD (Solid State Drive), or the like.

The memory 560 stores, for example, an application program 570. The memory 560 may store more than 2 application programs. The memory 560 also stores unillustrated programs which are necessary for the operations of the current system including an OS.

The management I/F 150 is a communication interface arranged to communicate via the management network 200 with the host management computer 120, the storage management computer 125, and the storage apparatus 130. The data I/F 140 is a communication interface arranged to communicate via the data communication network 190 with the storage apparatus 130.

Figure 4:
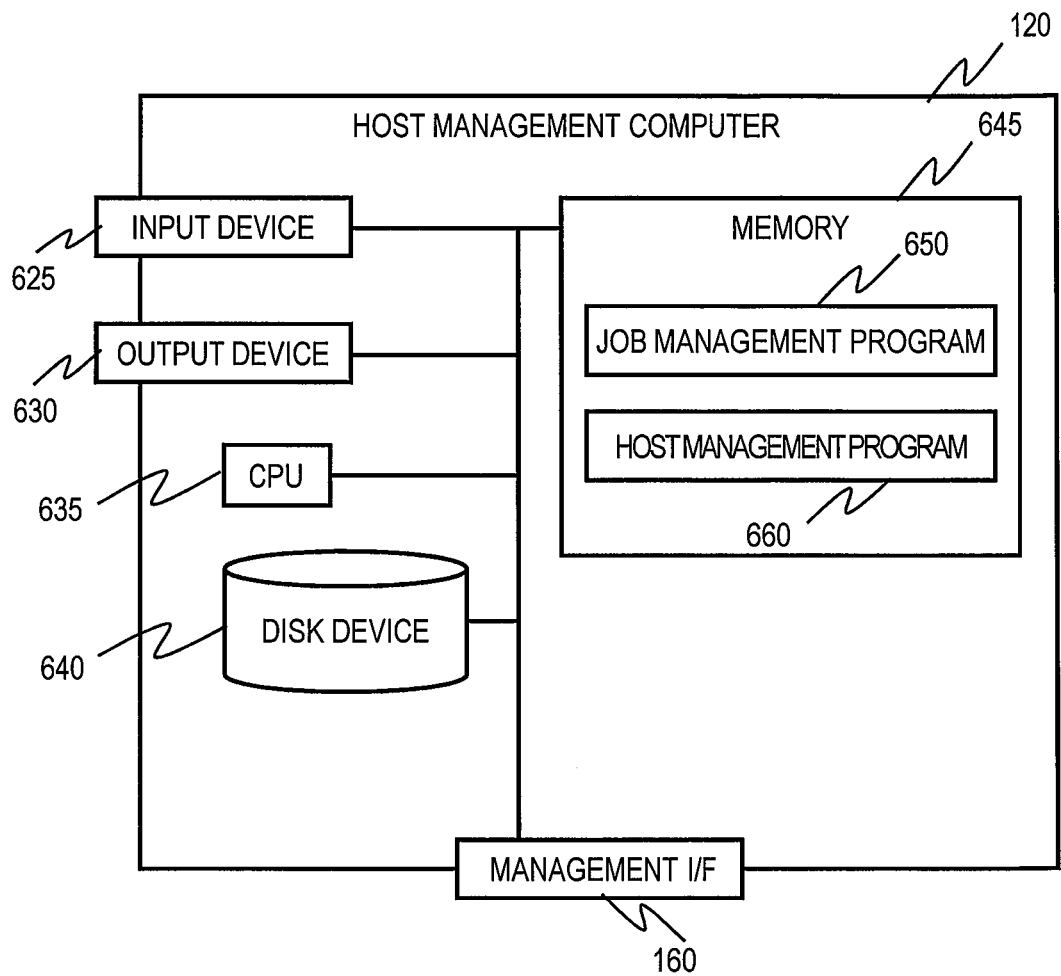
FIG. 4 schematically illustrates an example of a configuration of a host management computer according to the present embodiment.

FIG. 4 illustrates an example of a configuration of the host management computer 120. The host management computer 120 is, for example, a computer such as a personal computer or a workstation. The host management computer 120 includes an input device 625, and output device 630, a processor 635 (noted as CPU in the drawing), a disk device 640, a memory 645, and the management I/F 160.

The input device 625 is a device arranged for a user such as a system administrator to give an instruction to the host management computer 120. The input device 625 is, for example, a keyboard, a pointing device, a switch, a touch panel, a microphone, or the like.

The output device 630 is a device arranged for the host management computer 120 to output information to a user such as a system administrator. The output device 630 is, for example, a monitor display, a speaker, a printer, or the like.

The processor 635 controls, in accordance with a program and/or an operation parameter stored at the memory 645, an operation of the host management computer 120 in order to implement each type of function which will be described below. The disk device 640 is a physical storage device. The disk device is, for example, an HDD (Hard Disk Drive), an SSD (Solid State Drive), or the like.

The memory 645 stores, for example, a job management program 650, and a host management program 660. The memory 645 may also store unillustrated programs which are necessary for the operations of the current system including an OS.

The job management program 650 may be stored at a memory 745 of the storage management computer 125, or a memory of a third management computer. The job management program 650 defines, in accordance with a request inputted by a user such as a system administrator with respect to the input device 625, a content of a job and a content of a job net. The job management program 650 executes a process in accordance with the defined content of the job net which defines an order of execution and a schedule of the job.

The job management program 650 communicates with a job information management program 820 of a storage management computer 700 so as to transmit and receive each type of information. When the job management program 650 and the job information management program 820 are stored at a memory of the same computer, each communicates with one another inside the computer. When the job information management program 820 is stored at a memory of a computer different from the one at which the job management program 650 is stored, each communicates with one another via the management network 200.

To be more specific, the job management program 650 defines an execution commencement condition of a job, and defines a data storage area of the host computer 110 which is the target of the job. The job management program 650, in accordance with the execution commencement condition, writes and reads data in response to an operation command of the defined execution process with respect to a physical resource of the storage apparatus 130 which is the target of the defined data storage area of the host computer 110, and manages log information of previously executed jobs. The process of the job management program 650 will be described below in detail.

The host management program 660 manages configuration information and performance information of the host computer 110. The host management program 660 communicates with a host information management program 790 of the storage management computer 125 so as to transmit and receive each type of information. When the host management program 660 and the host information management program 790 are stored at a memory of the same computer, each communicates with one another inside the computer. When the host information management program 790 is stored at a memory of a computer different from the one at which the host management program 660 is stored, each communicates with one another via the management network 200.

The management I/F 160 is a communication interface arranged for the host management computer 120 to communicate via the management network 200 with the host computer 110, the storage management computer 125, and the storage apparatus 130.

Figure 5:
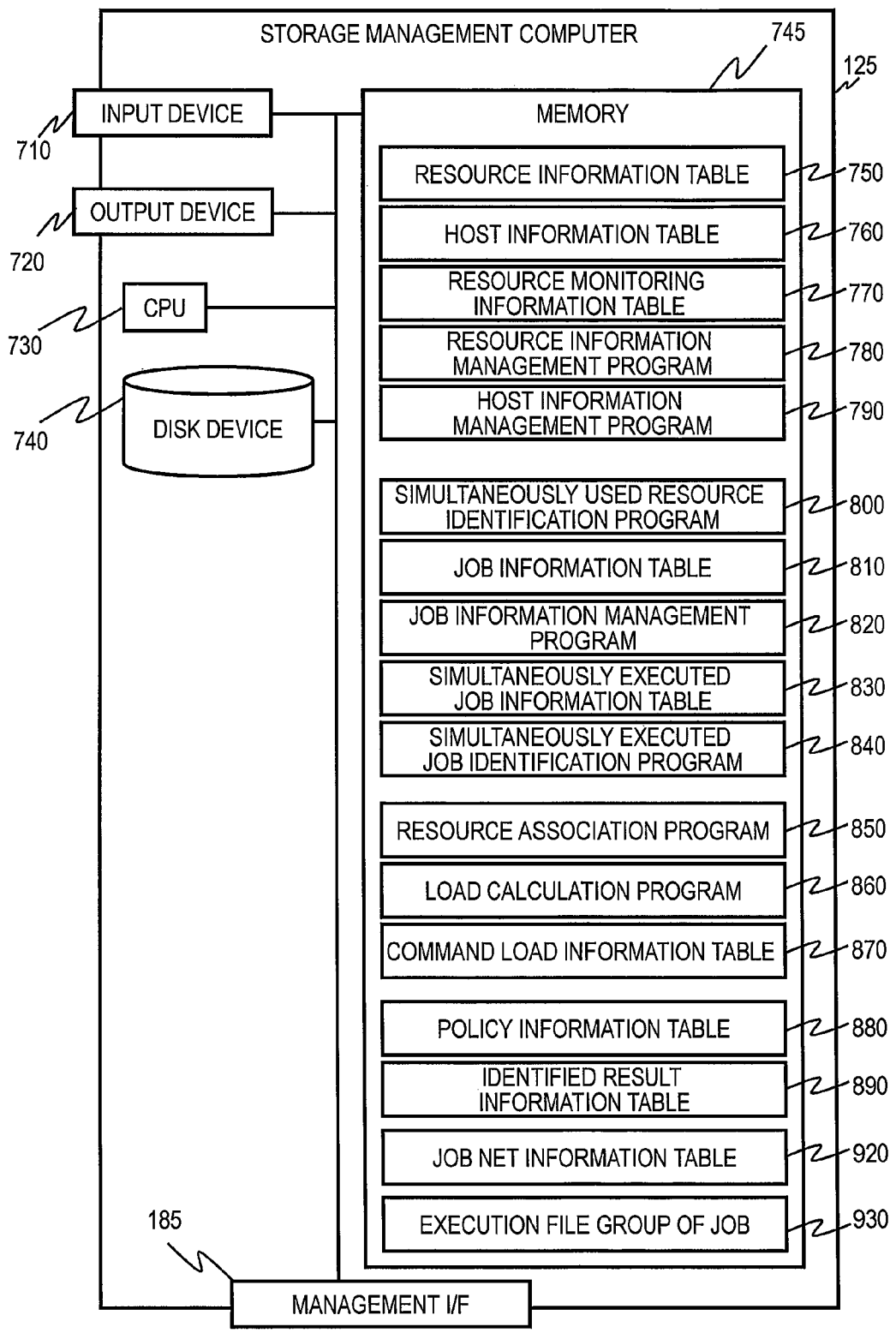
FIG. 5 schematically illustrates an example of a configuration of a storage management computer according to the present embodiment.

FIG. 5 illustrates an example of a configuration of the storage management computer 125. The storage management computer 125 is, for example, a computer such as a personal computer or a work station, or the like. The storage management computer 125 includes an input device 710, an output device 720, a processor 730 (noted as CPU in the drawing), a disk device 740, the memory 745, and the management I/F 185.

The input device 710 is a device arranged for a user such as a system administrator to give an instruction to the storage management computer 125. The input device is, for example, a key board, a pointing device, a switch, a touch panel, a microphone, or the like.

The output device 720 is a device arranged for the storage management computer 125 to output information to a user such as a system administrator. The output device 720 is, for example, a monitor display, a speaker, a printer, or the like. The processor 730 executes a program stored at the memory 745, and implements a function which will be described below. The disk device 740 is a physical storage device. The disk device 740 is, for example, an HDD (Hard Disk Drive), an SSD (Solid State Drive), or the like.

The memory 745 stores, for example, a resource information table 750, a host information table 760, a resource monitoring information table 770, a resource information management program 780, a host information management program 790, a simultaneously used resource identification program 800, the job information table 810, a job information management program 820, a simultaneously executed job information table 830, and the simultaneously executed job identification program 840.

The memory 745 stores therein a resource association program 850, a load calculation program 860, a command load information table 870, a policy information table 880, an identified result information table 890, the job net information table 920, a file group 930, which is executed by a job.

The simultaneously used resource identification program 800, which works based on the job information table 810, the job net information table 920, the simultaneously executed job information table 830, and the job information table 810, the job information management program 820 and the simultaneously executed job identification program 840 may be stored collectively at the memory 645 of the host management computer 110, or stored at a memory of a third computer.

The resource association program 850 and the load calculation program 860 operate based on the command load information table 870 and the resource information table 750. These may be stored collectively at the memory 645 of the host management computer 120, or stored at a memory of a third computer.

The policy information table 880 and the identified result information table 890 may be stored collectively at the memory 645 of the host management computer 120, or stored at a memory of a third computer.

Details concerning the configuration of the resource information table 750, the host information table 760, the resource monitoring information table 770, the job information table 810, the simultaneously executed job information table 830, the command load information table 870, the policy information table 880, and the identified result information table 890 will be described below.

The resource information management program 780 manages the resource information table 750 and the resource monitoring information table 770. The resource information management program 780 communicates with a resource management program 1040 and a resource monitoring program 1050 of the storage apparatus 130, which will be described below, to transmit and receive each type of information.

To be more specific, the resource information management program 780 stores information collected from the resource management program 1040 of the storage apparatus 130 at the resource information table 750, and updates the information as needed. The resource information management program 780 stores information collected from the resource monitoring program 1050 of the storage apparatus 130 at the resource monitoring information table 780 as time series information, and updates the information as needed.

The host information management program 790 manages information collected from the host computer 110. The host information management program 790 communicates with the host computer 110 and the host management computer 120 so as to transmit and receive each type of information. To be more specific, the host information management program 790 stores, at the host information table 760, a data storage area of the host computer 110 and data capacity concerning data handled by the host computer 110, and updates the same needed.

The simultaneously used resource identification program 800 identifies, based on the job information table 810 and the simultaneously executed job information table 830, a physical resource of the storage apparatus 130 used by a plurality of jobs which may possibly be executed simultaneously. The simultaneously used resource identification program 800 communicates with the simultaneously executed job identification program 840 and the resource association program 850 so as to transmit and received each type of information.

When the simultaneously used resource identification program 800 and the resource association program 850 are stored at a memory of the same computer, each communicates with one another inside the computer. When the simultaneously used resource identification program 800 is stored at a memory of a computer different from the one at which the resource association program 850 is stored, each communicates with one another via the management network 200. Details of this process will be described below.

The job information management program 820 manages the job information table 810 and the job net information table 920. The job information management program 820 communicates with the job management program 650 of the host management computer 120 so as to transmit and receive each type of information. To be more specific, the job information management program 820 stores information regarding a job at the job information table 800, stores information regarding a job net at the job net information table 920, and updates the information as needed.

When the job information management program 820 and the job management program 650 are stored at a memory of the same computer, each communicates with one another inside the computer. When the job information management program 820 is stored at a memory of a computer different from the one at which the job management program 650 is stored, each communicates with one another via the management network 200.

The simultaneously executed job identification program 840 identifies, based on the job net information table 920, a plurality of jobs which may possibly be executed simultaneously, stores the identified information at the simultaneously executed job information table 830, and manages the same.

The resource association program 850 associates, based on the resource information table 750 of the storage management computer 125 and the resource monitoring information table 770, a data storage area of the host computer 110 with the physical resource utilized at the storage apparatus 130 concerning data handled by the host computer 110.

The resource association program 850 communicates with the simultaneously used resource identification program 800 so as to transmit and receive each type of information. When the resource association program 850 and the simultaneously used resource identification program 800 are stored at a memory of the same computer, each communicates with one another inside the computer. When the resource association program 850 is stored at a memory of a computer different from the one at which the simultaneously used resource identification program 800 is stored, each communicates with one another via the management network 200. Details of the process will be described below.

The load calculation program 860 calculates, based on the command load information table 870, an I/O load on a physical resource which may possibly be used simultaneously. The load calculation program 860 communicates with the simultaneously used resource identification program 800 so as to transmit and receive each type of information.

When the load calculation program 860 and the simultaneously used resource identification program 800 are stored at a memory of the same computer, each communicates with one another inside the computer. When the load calculation program 860 is stored at a memory of a computer different from the one at which the simultaneously used resource identification program 800 is stored, each communicates with one another via the management network 200. Details of the process will be descried below.

The management I/F 185 is an interface arranged for the storage management computer 125 to communicate, via the management network 200, with the host computer 110, the host management computer 120, and the storage apparatus 130. It is to be note that when describing the contents processed by the processor 730 in accordance with each program, the focus of the description will be mainly on each program.

Figure 6:
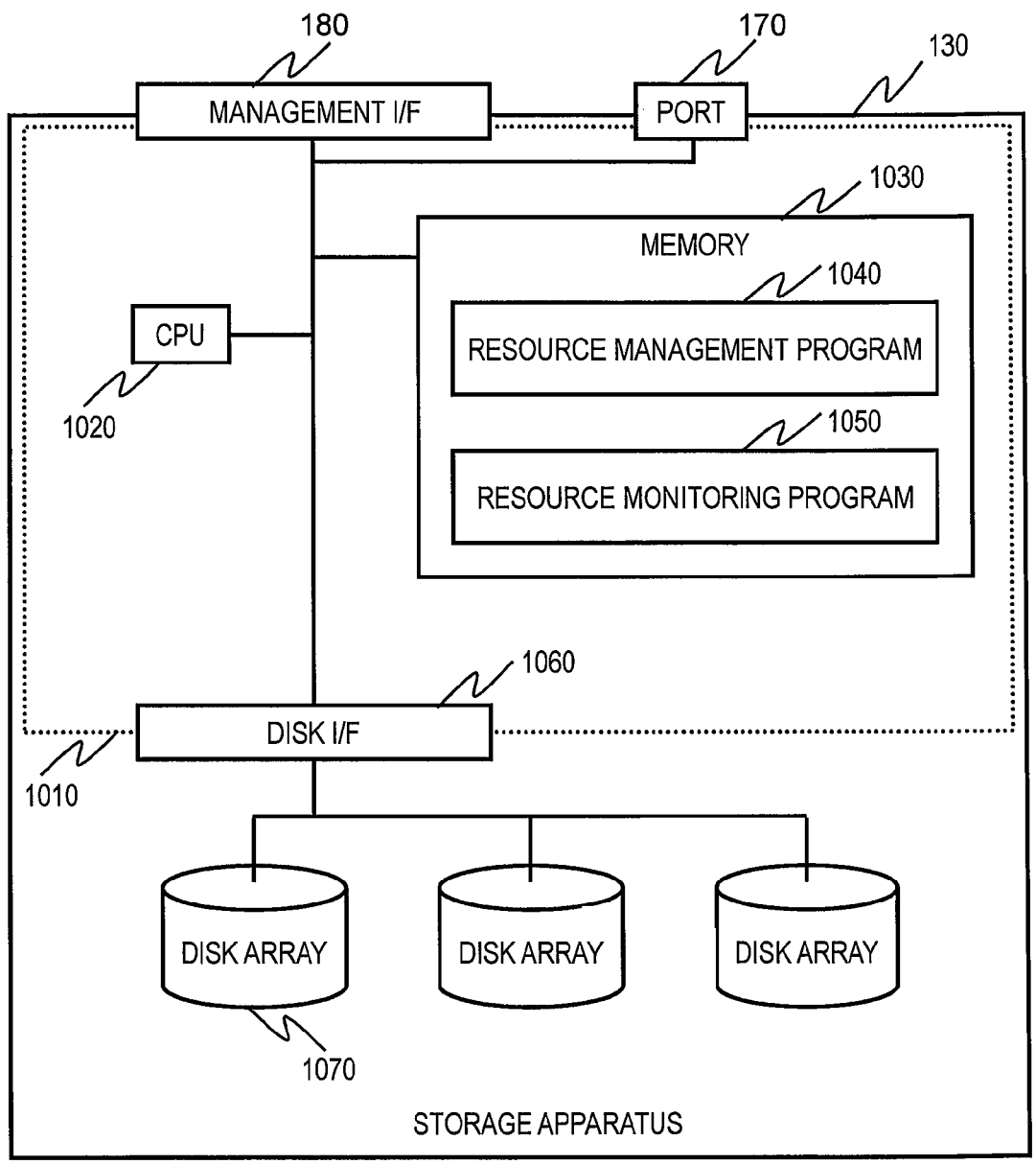
FIG. 6 schematically illustrates an example of a configuration of a storage apparatus according to the present embodiment.

FIG. 6 illustrates an example of a configuration of the storage apparatus 130. The storage apparatus 130 includes, for example, a controller 1010 and at least one disk array 1070. The controller 1010 includes a processor (noted as "CPU") 1020, a memory 1030, the management I/F 180, at least one communication port 170, and a disk I/F 1060. The controller 1010 controls the operations of the storage apparatus 130.

The processor 1020 executes each program stored at the memory 1030, and implements predetermined functions. The memory 1030 stores, for example, the resource management program 1040 and the resource monitoring program 1050.

The resource management program 1040 manages the disk array 1070 of the storage apparatus 130, the logical storage resource (including logical volume and pool) created based on the disk array 1070, and a virtual storage resource, or the like. The disk array 1070 includes a plurality of disk drives storing therein user data which is made redundant, and includes a RAID configuration, for example.

The resource management program 1040 communicates with the resource information management program 780 of the storage management computer 125, so as to transmit and receive each type of information. To be more specific, the resource management program 1040 collects, for example, information concerning the physical resource, the logical resource, and the virtual resource of the storage apparatus 130.

The resource monitoring management program 1050 monitors the physical resource, the logical storage resource, and the virtual storage resource of the storage apparatus 130. The resource monitoring management program 1050 communicates with the resource information management program 780 of the storage management computer 125 so as to transmit and receive each type of information.

To be more specific, the resource monitoring management program 1050 collects information concerning the change of an I/O load of the physical resource of the storage apparatus 130, and the change of a data capacity stored at the physical storage resource (disk array 1070), for example.

The management I/F 180 is a communication interface arranged for the storage apparatus 130 to communicate via the management network 200 with the host computer 110, the host management computer 120, and the storage management computer 125.

The communication port 170 is a communication interface arranged to communicate via the data communication network 190 with the host computer 110. The communication port 170 is a physical resource whose number of processable I/Os (IOPS) per a unit time is predetermined, and not operable to process any I/Os therebeyond.

The disk I/F 1060 is an interface arranged for the controller 1010 to access the disk array 1070. The disk array 1070 is a physical storage resource arranged to store data. The disk array is operable to include, as components thereof, various devices which are operable to read and write data, for example, a hard disk drive, a semiconductor memory drive, an optical disk drive, a magneto optical disk drive, or the like.

Various types of hard disk drives may be used. For example, FC (Fiber Channel) disk drive, SCSI (Small Computer System Interface) disk drive, SATA (Serial Advanced Technology Attachment) disk drive, ATA disk drive, SAS (Serial Attached SCSI) disk drive, or the like, may be used.

Further a storage drive, for example, flash memory, FeRAM (Ferroelectric Random Access Memory), MRAM (Magnetoresistive Random Access Memory), phase shift memory (Ovonic Unified Memory), RRAM (Resistance RAM), or the like, may be used.

The number of I/Os (IOPS) processable per a unit time for the physical storage resource is predetermined, and it is impossible to process any more I/Os therebeyond. Further, the number of I/O differs depending on the type of drive or product thereof.

Figure 7:
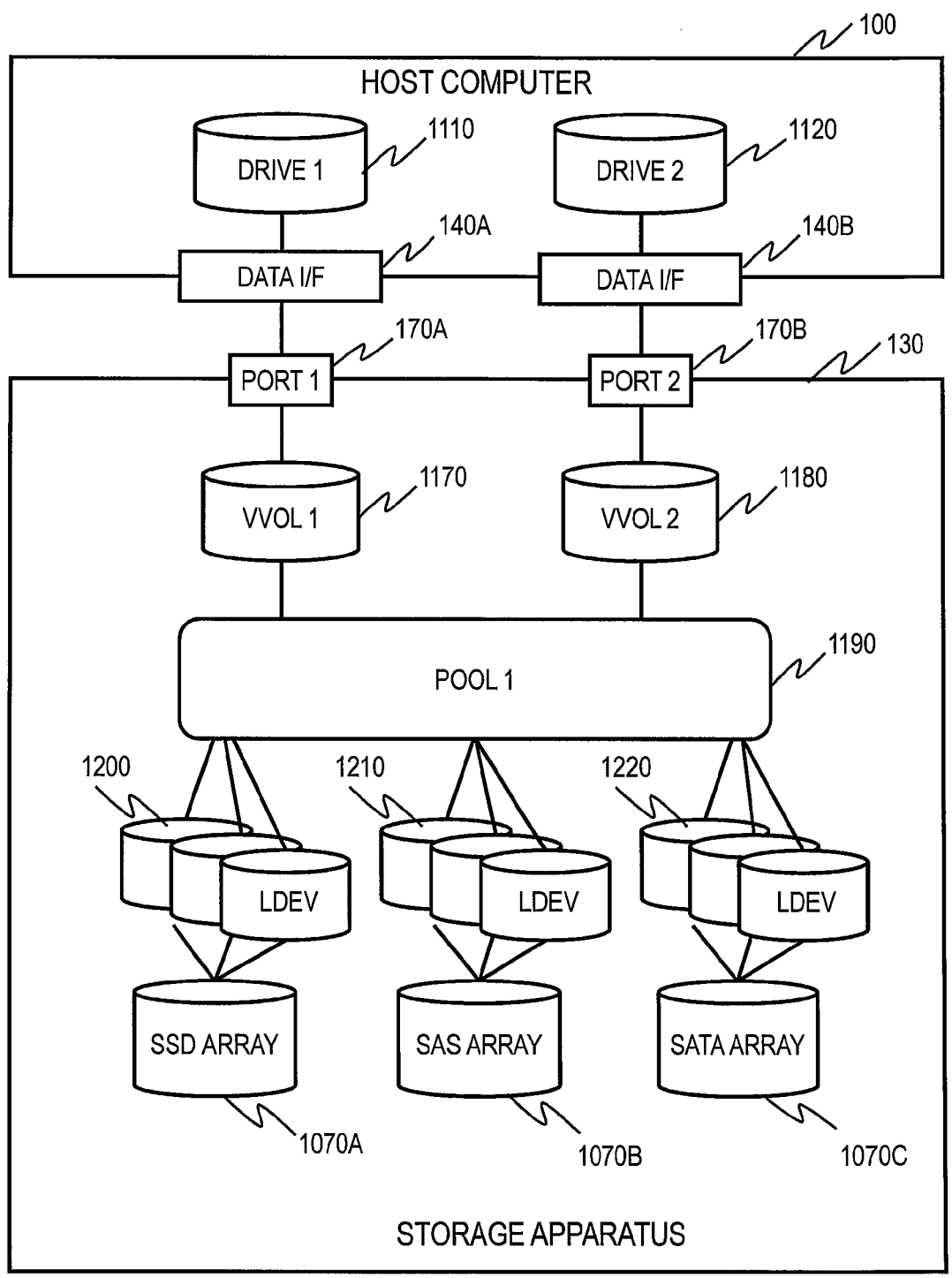
FIG. 7 schematically illustrates an example of a volume configuration of the computer system according to the present embodiment.

FIG. 7 illustrates a conceptual diagram of an example of a volume configuration provided by the storage apparatus 130. The storage system includes at least one storage apparatus 130. A thin provisioning technique is applied to the at least one storage apparatus 130. Although the host management computer 120 and the storage management computer 125 are not depicted, they include the configuration shown in FIG. 4 and FIG. 5.

The storage apparatus 130 includes a plurality of types of physical storage resources having an I/O process performance different from one another. According to an example of FIG. 7, the storage apparatus 130 includes an SSD array 1070A, an SAS array 1070B, and an SATA array 1070C.

The SSD array 1070A includes a plurality of SSDs, and stores user data which is provided with redundancy. The SAS array 1070B includes a plurality of SAS disk drives, and stores user data which is provided with redundancy. The SATA array 1070C includes a plurality of SATA disk drives, and stores user data which is provided with redundancy. The storage apparatus 130 is operable to include multiple SSD arrays 1070A, multiple SAS arrays 1070B, and multiple SATA arrays 125.

Among these physical storage resources 1070A to 1070C, the SSD array 1070A, the SAS array 1070B, and the SATA array 1070C are in a descending order of I/O process performance. The storage apparatus 130 makes a determination on access frequency with respect to data in a relative manner such that data with the highest access frequency is stored at the SSD array 1070A, data with medium access frequency is stored at the SAS array 1070B, and data with lowest access frequency is stored at the SATA array 1070C.

The storage apparatus 130 includes a plurality of logical volumes 1200, 1210, and 1220 which are indicated as the "LDEV." The logical volume inherits the I/O process performance of the physical storage resource to which a physical storage area is allocated.

The logical volume 1200 is formed by logicalizing the physical storage area of the SSD array 1070A, and includes the physical storage area of the SSD array 1070A allocated thereto. The logical volume 1210 is formed by logicalizing the physical storage area of the SAS array 1070B, and includes the physical storage area of the SAS array 1070B allocated thereto. The logical volume 1220 is formed by logicalizing the physical storage area of the SATA array 1070C, and includes the physical storage area of the SATA array 1070C allocated thereto.

The storage apparatus 130 includes a capacity pool (hereinafter, referred to as pool) 1190. The storage apparatus 130 is operable to include more than one pool. The pool 1190 is a logical storage resource which includes at least one logical volume whose performance may be equal thereto or different therefrom. In the current example, the pool 1190 includes the logical volumes 1200, 1210, and 1220 whose I/O process performances are different from one another.

The storage apparatus 130 includes virtual volumes (virtual storage resource) 1170 and 1180 which are indicated as "VVOL1" and "VVOL2." The virtual volumes 1170 and 1180 are formed by virtualizing the storage area of the pool 1190.

The storage apparatus 130 includes communication ports 170A and 170C which are indicated as the "Port 1" and the "Port 2," and which provide the host computer 110 with the virtual volumes 1170 and 1180. The communication ports 170A and 170C are the physical resource of the storage apparatus 130. The storage apparatus 130 further includes an unillustrated management I/F in order to communicate with the host management computer 120 and the storage management computer 125.

The logical volumes 1200, 1210, and 1220 are divided into units of storage area referred to as page (logical page), which is an area arranged to store therein a certain amount of data. With respect to each logical page, physical pages, which are physical storage areas each having an equal amount of physical storage area are allocated from the physical storage resources 1070A to 1070C. To the virtual storage area of the virtual volumes 1170 and 1180, logical pages are dynamically allocated in accordance with a write from the host computer 110.

The data which is accessed from the host computer 110 via the virtual volumes 1170 and 1180 is stored at the physical storage resources 1070A to 1070C via the pages of the logical volumes 1200, 1210, and 1220 having an appropriate I/O process performance in accordance with the I/O frequency of the data. Note that the logical storage resource of the storage apparatus 130 may be a logical resource provided from a storage apparatus different from the storage apparatus 130.

The host computer 110 includes logical drives 1110 and 1120, which are indicated as the "Drive 1" and "Drive 2." The drives 1110 and 1120 are logical data storage area at the host computer 110 for the data handled by the host computer 110. The host computer 110 further includes data interfaces 1130 and 1140 arranged to carry out data communication with communication ports 1150 and 1160 of the storage apparatus 130. The host computer 110 further includes an unillustrated management I/F arranged to communicate with the host management computer 120 and the storage management computer 125.

In the current example, the communication port 170A, the virtual volume 1170, and the pool 1190 of the storage apparatus 130 are allocated to the drive 1110. The data, which includes the drive 1110 as a storage area therefor, is stored, via the logical volumes 1200, 1210, and 1220, at the physical storage resources 1070A to 1070C.

The communication port 170B, the virtual volume 1180, and the pool 1190 of the storage apparatus 130 are allocated to the drive 1120. The data, which includes the drive 1120 as a storage area therefor, is stored, via the logical volumes 1200, 1210, and 1220, at the physical storage resources 1070A to 1070C.

The target data of multiple jobs which may possibly be executed simultaneously are stored at the drives 1110 and 1120. While the communication ports and the virtual volumes different from one another are allocated to the drive 1110 and drive 1120, the same logical volumes 1200, 1210, 1220 and physical storage resources 1070A to 1070C are allocated thereto.

The physical storage resources, at which the data of the drive 1110 and the drive 1120 are actually stored, vary, as stated above, depending on the I/O frequency of each data. However, for example, when the access frequency of the data, which include the drive 1110 and drive 1120 as the storage area therefor, is higher compared with other data stored via the pool 1190 at the physical storage resources 1070A to 1070C, a large portion of the data of the drive 1110 and the drive 1120 are stored at the SSD array 1070A.

In a such state, when the host computer 110 executes multiple jobs simultaneously with respect to the data of the drives 1110 and 1120, a load is concentrated on the physical storage resource 1070A of the storage apparatus 130.

According to the present embodiment, by associating the data storage area of the host computer 110 for the data handled by the host computer 110 with the physical resource of the storage apparatus 130, the concentration of a load on a specific physical resource of the storage apparatus 130 is estimated.

FIG. 8 illustrates an example of a configuration of the job information table 810. The job management program 650 creates a table similar to the job information table 810 based on a user input and/or information collected from the host computer 110. The job management program 650 transmits the information of the created table to the job information management program 820. The job information management program 820 creates the job information table 810 and stores the received information. The job information management program 820 manages the job information table 810 in a manner associating the job net information table 920 therewith.

According to FIG. 8, the job information table 810 includes a job column 1310, an execution apparatus column 1320, an execution file column 1330, and an execution argument column 1340. Entries in the table are sorted by the values in the job column 1310 in an ascending order.

The job column 1310 indicates an identification of a job at a job net. The execution apparatus column 1320 indicates an identifier of the computer executing the job indicated in the job column 1310. The execution file column 1330 indicates an identifier of a file executed by the job in the job column 1310. One job executes one or multiple files.

The execution file indicated in the job information table 810 is included in the execution file group 930 of a job. The execution file of a job indicates, for example, the information of an identifier of an apparatus which executes the file, at least one execution command, a storage area of the data which is the target of the at least one execution command, or the like.

The execution argument column 1340 indicates an argument or an execution content of a file to be executed. The execution argument column 1340 may indicate a data storage area of the host computer 110 for the data handled by the host computer 110. The execution argument column 1340 may indicate the content of an execution file omitting the execution file column 1330 from the table. The execution file column 1330 may indicate the data storage area of the host computer 110 of a target data.

FIG. 9 illustrates an example of a configuration of the job net information table 920. The job management program 650 creates a table similar to the job net information table 920 based on a user input and/or the information collected from the host computer 110. The job management program 650 transmits the information of the created table to the job information management program 820. The job information management program 820 creates the job net information table 920 and stores the received information. The job information management program 820 manages the job net information table 920 in a manner associating the job information table 810 therewith.

The job net information table 920 includes a job column 1510, a data storage area column 1520, and an execution commencement condition column 1530. Entries in the table are sorted by the values in the job column 1510 in an ascending order.

The job column 1510 indicates an identification of a job. The data storage area column 1520 indicates a data storage area of the host computer 110 for the data handled by the host computer 110, which is the target of the job in the job column 1510. One job accesses one or multiple data storage areas.

The target data of one execution file is stored at one or multiple storage areas of the host computer 110. According to the examples in FIG. 8 and FIG. 9, there is only one target data storage area for one execution file. When the target data of one execution file is stored at multiple storage areas, the job information table 810 includes an entry for each storage area.

The execution commencement condition column 1530 indicates an identifier of a job which needs to be completed in order for a job in the job column 1510 to commence. The execution commencement condition column 1530 may indicate multiple job identifications for one entry. Note that there are occasions where jobs before commencing a job net do not include the execution commencement condition (column 1530).

FIG. 10 illustrates a configuration of the resource information table 750. The resource management program 1040 of the storage apparatus 130 creates a table similar to the resource information table 750, and transmits the information thereof to the storage management computer 125. The resource information management program 780 uses the information received from the resource management program 1040 to create the resource information table 750 and manages the same.

The resource information table 750 indicates a correlation between the resources (virtual resource, logical resource and physical resource) of the data storage area and the storage apparatus 130 of the host computer. The resource information table 750 includes a volume column 1610, a storage apparatus column 1620, a port column 1630, an array column 1640, a volume type column 1645, a pool column 1650, a Tier 0 utilization volume column 1660, a Tier 1 utilization volume column 1670, a Tier 2 utilization volume column 1680, a host column 1690, and a mount destination of the host computer column 1691.

The volume column 1610 indicates an identifier of a volume (logical volume and virtual volume) a storage system includes. The storage apparatus column 1620 indicates an identifier of the storage apparatus 130 to which a volume in the volume column 1610 belongs.

The port column 1630 indicates an identifier of a communication port which transfers an I/O command from the host computer 110 to the volume of the volume column 1610. The array column 1640 indicates an identifier of an array (physical storage resource) which provides the volume of the volume column 1610 with a physical storage area. When the volume of the volume column 1610 is a virtual resource, the array column 1640 indicates, for example, an identifier of a disk array having a highest I/O performance. Note that a physical storage resource may be managed in units of drive instead of units of array.

The volume type column 1645 indicates a type of a volume of the volume column 1610. Defined volume types include a virtual volume indicated as "VVOL," a logical volume (pool volume) of a component of a pool indicated as "Pool Vol," and a logical volume (not depicted) which does not belong to either pool. Note that "-" used in FIG. 10 indicates that the volume is the logical volume which does not belong to either pool.

The pool column 1650 indicates an identifier of a pool to which a volume belongs when the volume is a virtual volume. When the volume of the volume column 1610 is a virtual volume, the Tier 0 utilization volume column 1660, the Tier 1 utilization volume column 1670, and the Tier 2 utilization volume column 1680 indicate, per each Tier, a data capacity the virtual volume utilizes at a pool.

According to the example of the configuration in FIG. 7, the pool 1190 includes 3 types of logical resources 1070A to 1070C each having an I/O process performance different from one another. The Tier 0 utilization volume column 1660 indicates a data capacity stored at the logical resource 1200 which is cut logically from the SSD array 1070A.

The Tier 1 utilization volume column 1670 indicates a data capacity stored at the logical resource 1210 which is cut logically from the SAS array 1070B. The Tier 2 utilization volume column 1680 indicates a data capacity stored at the logical resource 1220 which is cut logically from the SATA array 1070C. The Tier is a logical storage resource.

The host column 1690 indicates an identifier of the host computer 110 to which the volume of the volume column 1610 is provided. The mount destination of the host computer column 1691 indicates a data storage area of the host computer 110 to which the volume of the volume column 1610 is allocated.

FIG. 11 illustrates an example of a configuration of the simultaneously executed job information table 830. The simultaneously executed job table 830 indicates jobs which may possibly be executed simultaneously as identified by the simultaneously executed job identification program 840 based on the job net information table 920.

The simultaneously executed job information table 830 includes a job column 1710, and a simultaneously executed job column 1720. The job column 1710 indicates an identifier of a job which may possibly executed simultaneously with another job.

The simultaneously executed job column 1720 indicates an identifier of a job which may possibly be executed simultaneously with the job in the job column 1710. Each entry indicates an identifier for one or multiple jobs at the simultaneously executed job column 1720. A method to identify jobs which may possibly be executed simultaneously will be described below.

FIG. 12 illustrates an example of a configuration of the command load information table 870. The command load information table 870 is a table arranged to indicate an IOPS (number of input and output needed per second) per each operation command a job executes. The command load information table 870 includes a command column 1910 and an IOPS column 1920.

The command column 1910 indicates an identifier of an operation command of an execution process which is defined by an execution file of a job, or an identifier of an operation command of an execution process designated by the execution argument column 1340. The command column 1910 may indicate either an entire operation command which the job management program 650 supports, or only a main operation command whose IOPS is large. The IOPS column 1920 indicates an IOPS of a command in the command column 1910. Values indicated in the IOPS 1920 may be the values calculated from the information of the results of previous job executions, or the values inputted by a user.

FIG. 13 illustrates an example of a configuration of the resource monitoring information table 770. The resource monitoring information table 770 indicates time series information of the utilization capacity of a volume. The resource monitoring management program 1050 of the storage apparatus 130 creates a table which includes information similar to the volume managed by the resource monitoring information table 770, and transmits the information thereof to the storage management computer 125.

The resource information management program 780 creates, from the information collected from the storage apparatus 130, the resource monitoring information table 770, and manages the same.

The resource monitoring information table. 770 includes a volume column 2010, a storage apparatus column 2020, a date and time column 2030, a Tier 0 utilization volume column 2040, a Tier 1 utilization volume column 2050, and a Tier 2 utilization volume column 2060.

The volume column 2010 indicates an identifier of a volume. The storage apparatus column 2020 indicates an identifier of the storage apparatus to which the volume of the volume column 2010 belongs. The date and time column 2030 indicates a date and time when the monitoring information of the utilization capacity per each Tier is acquired.

When the volume in the volume column 2010 is a virtual resource, the Tier 0 utilization volume column 2040, the Tier 1 utilization volume column 2050, and the Tier 2 utilization volume column 2060 indicate, per each Tier, the capacity the volume utilizes at a capacity pool.

Note that a time period or a cycle of when the information of the utilization volume columns 2040, 2050, and 2060 for each Tier is acquired is set by each storage apparatus 130, and that each storage apparatus 130 may transmit the information to the storage management computer 125 in accordance with the setting, or the storage management computer 125 may request the information in accordance with the setting to each storage apparatus 130.

Figure 14:
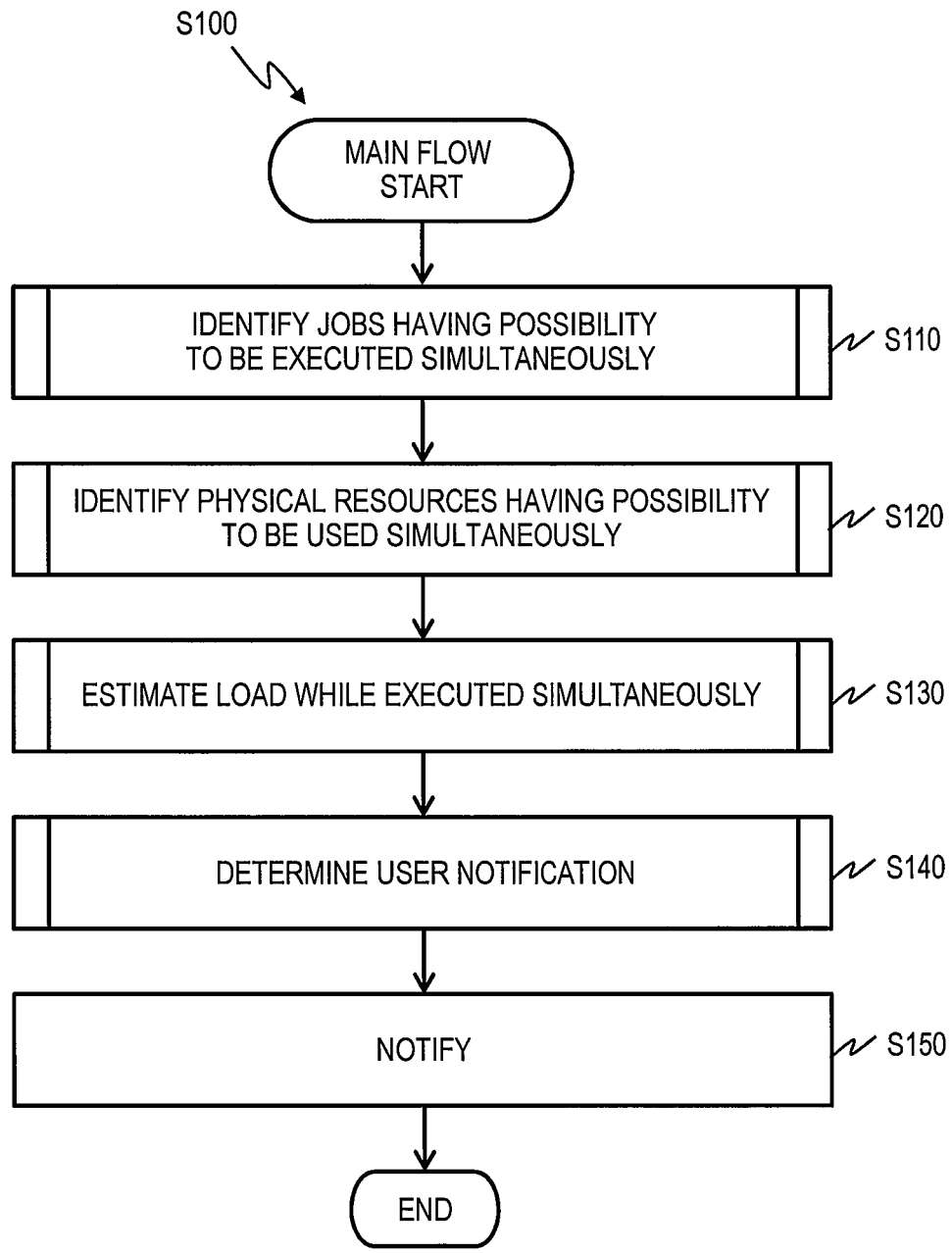
FIG. 14 illustrates an example of a flowchart for a summary of a process of a simultaneously used resource identification program according to the present embodiment.

FIG. 14 is a flowchart illustrating a summary of a process S100 of the simultaneously used resource identification program 800. FIG. 15 to FIG. 18 are flowcharts illustrating the flows of detailed steps of FIG. 14.

According to FIG. 14, the simultaneously used resource identification program 800 executes, when the information of a newly created job net is received from either the host computer 110 or the host management computer 120, the simultaneous use resource identification process S100 with respect to the job net. The simultaneously used resource identification program 800 may execute the simultaneous use resource identification process S100 a predetermined period of time prior to an execution time of the job net, or at a time defined by a user.

According to FIG. 14, the simultaneously used resource identification program 800 identifies, by using the simultaneously executed job identification program 840, a plurality of jobs which may possibly be executed simultaneously (S110). Details of the step S110 will be described below with reference to FIG. 15.

Next, the simultaneously used resource identification program 800, by using the resource association program 850, identifies, based on the information of the simultaneously executed jobs identified at the step S110, the physical resources of the storage apparatus which may possibly be used simultaneously (S120). Details of the step S120 will be described below with reference to FIG. 16.

Next, the simultaneously used resource identification program 800, using the load calculation program 860, estimates, based on the information of the physical resources which may possibly be used simultaneously as identified at the step S120, a load on the physical resource when the multiple jobs are executed simultaneously (S130). Details of the step S130 will be described below with reference to FIG. 17.

Further, the simultaneously used resource identification program 800 makes a determination on a notification option from a notification policy from a user (S140), and notifies the process result to a user such as a system administrator in accordance with the notification policy (S150). Details of the step S140 will be described below with reference to FIG. 18.

Figure 15:
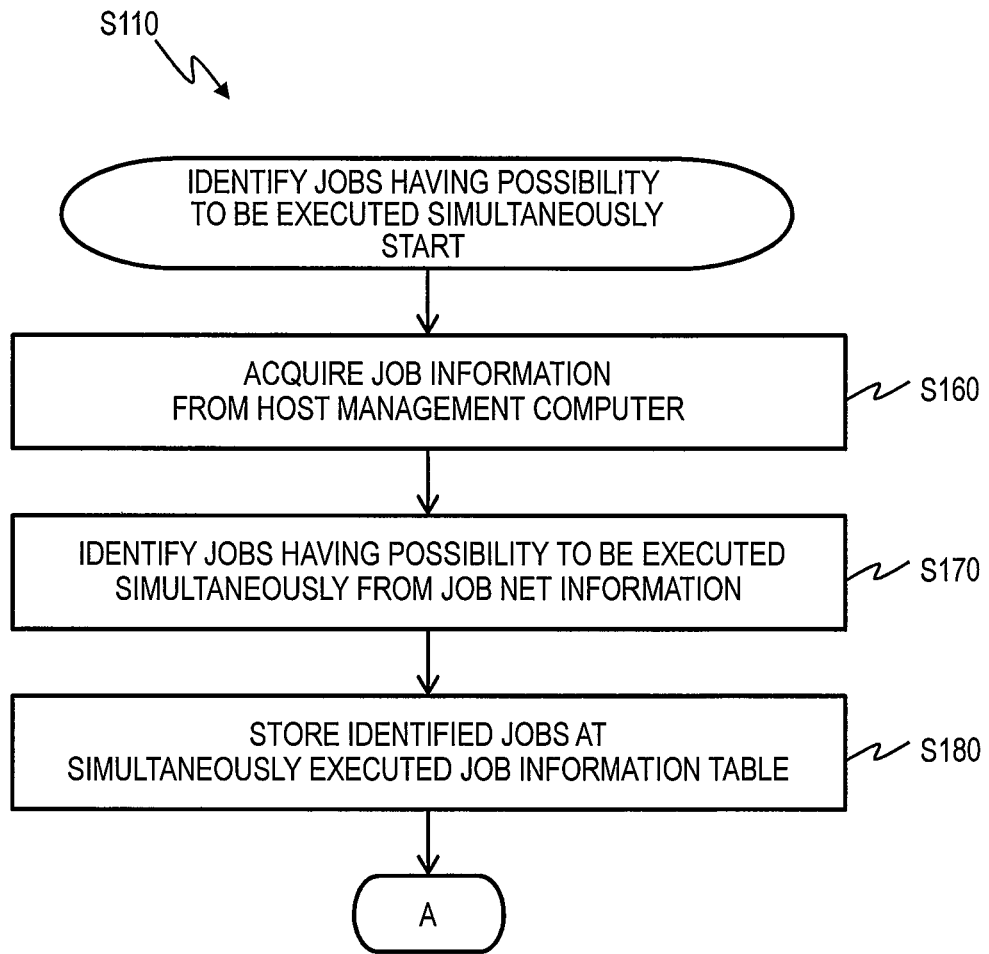
FIG. 15 illustrates an example of a flowchart of a process to identify jobs which may possibly be executed simultaneously according to the present embodiment.

FIG. 15 illustrates a detailed flow of the step S110 where the jobs which may possibly be executed simultaneously are identified. The simultaneously executed job identification program 840 carries out, upon receiving an instruction from the simultaneously used resource identification program 800, the process in accordance with the flowchart in FIG. 15.

The simultaneously executed job identification program 840 instructs the job information management program 820 to acquire information related to a job net or a job from the job management program 650 of the host management computer 120, and has the job information table 810, the job execution file group 930, and the job net information table 920 store the information (S160).

Next, the simultaneously executed job identification program 840 refers to the job net information table 920, and identifies a plurality of jobs which may possibly be executed simultaneously (S170). An exemplary method to identify the jobs, which may possibly be executed simultaneously, is as follows. The simultaneously executed job identification program 840 may identify the plurality of jobs which may possibly be executed simultaneously via a method different from the method described below.

As illustrated in FIG. 2, at a job net, multiple paths may branch out from one job. In the example of FIG. 2, a first path for the jobs 350 and 351, and a second path for the jobs 352 and 353 branch out from the job 354 (start point job) which is indicated as "Job A." These two paths join at the job 355 (end point job) which is indicated as "Job F." The first path and the second path include a parallel relation.

The simultaneously executed job identification program 840 determines that the above stated 2 paths may possibly be executed simultaneously. That is, it is determined that each job in the first path may be executed simultaneously with each job in the second path. To be more specific, the simultaneously executed job identification program 840 determines that the job 350 may possibly be executed simultaneously with each of the job 352 and the job 353. Further, the simultaneously executed job identification program 840 determines that the job 351 may possibly be executed simultaneously with each of the job 352 and the job 353.

The simultaneously executed job identification program 840 refers to the job net information table 920, and identifies paths (branching path) branching from a job. A branching path joins with another branching path at another job, or includes an open end which does not join with any other branching path. Note that a branching path may include a plurality of paths (internal branching path) further branching from a job within the branch path.

In this manner, a path which branches out includes one or a plurality of jobs. A plurality of jobs, which configure one branching path, include jobs which are executed sequentially and in a vertical relation. When one branching path includes an internal branching path, the jobs from separate internal branching paths are in a parallel relation. The simultaneously executed job identification program 840 determines that the branching paths branching from a single job have a possibility to be executed simultaneously.

Next, the simultaneously executed job identification program 840 stores the information which indicates the multiple jobs which may possibly be executed simultaneously, as identified at the step S170, at the simultaneously executed job information table 830 (S180).

According to the example in FIG. 11, each entry in the simultaneously executed job information table 830 indicates one or a plurality of pairs which may possibly be executed simultaneously. For each entry, each pair includes the job of the job column 1710. When both of two jobs which make up a pair form a pair with a single job, a job group including the three jobs may possibly be executed simultaneously. Note that when there is a possibility that one of the jobs which make up the pair is executed simultaneously with a third job, there is a possibility that the other job of the pair is executed simultaneously with the third job accordingly.

As such, by adding a third job which is possibly executed simultaneously with a group (pair being a type of group) of jobs all of which are possibly executed simultaneously, it becomes possible to form a group (hereinafter referred to simultaneous job group) which includes the jobs which are all possibly executed simultaneously.

Figure 16:
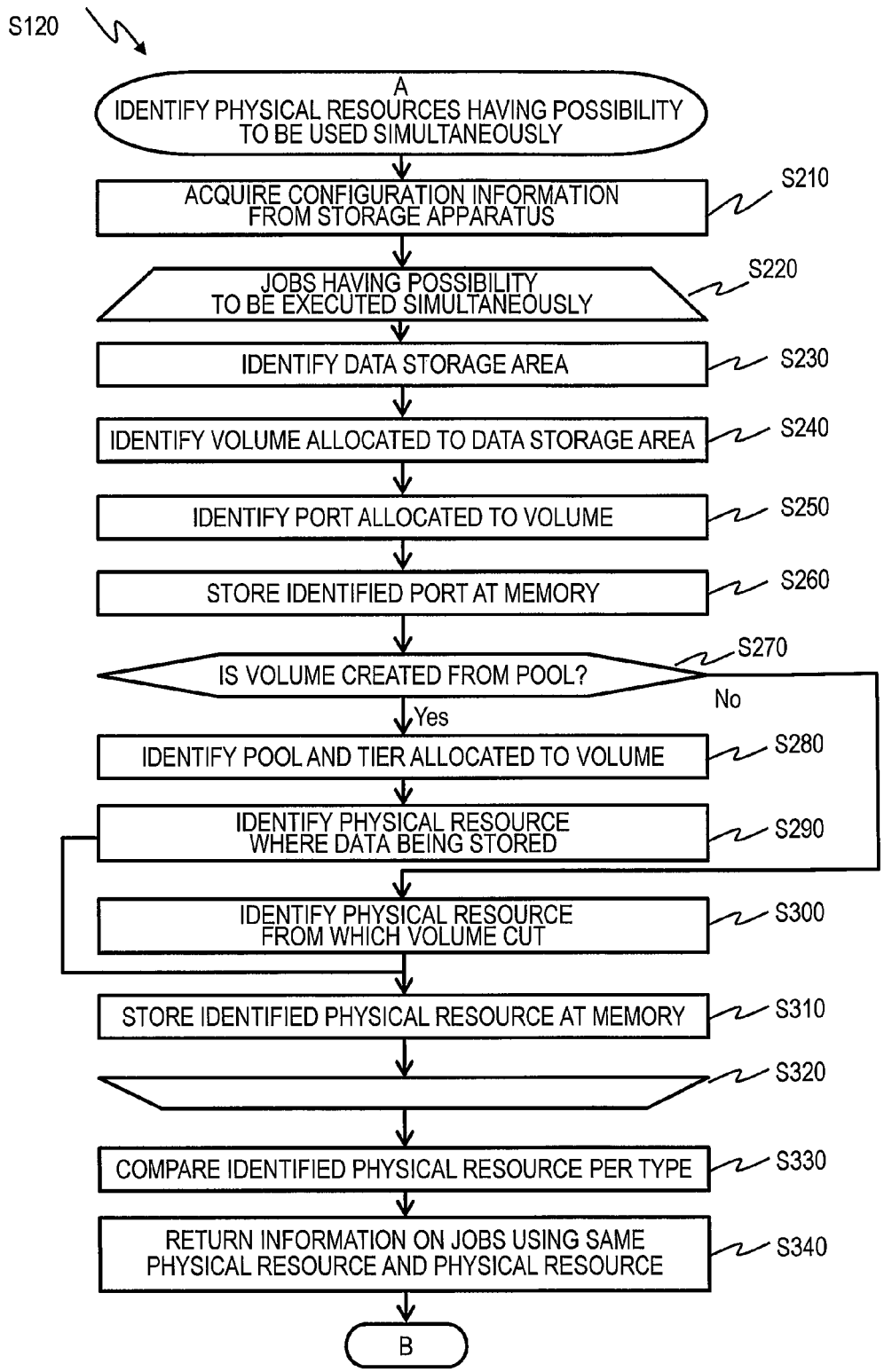
FIG. 16 illustrates an example of a flowchart of a process to identify physical resource which may possibly be executed simultaneously according to the present embodiment.

FIG. 16 illustrates a detailed flow of the step S120 in which physical resources of the storage apparatus 130 which may possibly be used simultaneously are identified. The resource association program 850 receives an instruction from the simultaneously used resource identification program 800, and carries out a process in accordance with the flowchart in FIG. 16. According to this process, an appropriate determination is made, in a manner corresponding to types of resources of the storage apparatus 130, with respect to the physical resources which may possibly be executed simultaneously.

To start, the resource association program 850 gives an instruction to the resource information management program 780 to acquire resource information from the resource management program 1040 of the storage apparatus 130 and to store the same at the resource information table 750 (S210).

The resource association program 850 refers to the simultaneously executed job information table 830, and identifies a simultaneous execution job group, which includes jobs which may all possibly be executed simultaneously. Note that one job may belong to a plurality of simultaneous execution job groups. When a plurality of simultaneous execution job groups are identified, the resource association program 850 executes, with respect to each simultaneous execution job group, the step S220 to the step S340. The resource association program 850 identifies, at each loop, the physical resource (physical port and physical storage resource (disk array)) each job of the simultaneous execution job groups uses.

Firstly, the resource association program 850 selects from a simultaneous execution job group one unselected job (S220). Next, the resource association program 850 identifies the data storage area of the host computer 110 for the data which is the target of the selected job (S230). To be more specific, the resource association program 850 identifies an execution apparatus (host computer 110) for the job at the execution apparatus 1320 of the job information table 810, and further identifies the identified data storage area of the host computer 110 at the data storage area column 1520 of the job net information table 920.

Next, the resource association program 850 refers to the mount destination of the host computer column 1691 and the volume column 1610 of the resource information table 750, and identifies the volume which associates with the data storage area which is identified in the step S230 (S240).

The resource association program 850 selects a deepest path (path having a greatest coincidence) which includes a part of the path of the data storage area identified by the step S230 at the mount destination of the host computer column

1691. The resource association program 850, for example, compares, while deleting the file of the data storage area identified by the step S230 or the deepest directory, the value of the mount destination of the host computer column 1691 with the same, and searches a value matching therewith.

For example, as indicated by the job information table 810 and the job net information table 920, the first data storage area of the job B is "C:¥data¥com¥001¥data2.mdb" of "host 1," and the second data storage area is "C:¥data¥com¥002¥data2-1.mdb" of "host 1."

The resource association program 850 searches an entry which indicates a host and a directory having the data storage areas same as ones stated above at the resource information table 750. The path (columns 1690 and 1691) of an entry for "VOL1" includes the greatest coincidence with the above stated first data storage area. The path (columns 1690 and 1691) of an entry for "VOL4" includes the greatest coincidence with the above stated second data storage area. Thus, the resource association program 850 determines that the volumes of the job B are the volumes VOL1 and VOL4.

Next, the resource association program 850 refers to the port column 1630 of the resource information table 750, identifies a port which is allocated to each volume identified by the step S240 (S250), associates the information indicating the finding of the step S250 with a job, and stores the same at the memory 754 (S260).

The resource association program 850 refers to the volume column 1645 of the resource information table 750 in order to make a determination on whether each volume identified by the step S240 is a virtual volume (VVOL) created from a pool (S270). When the volume is a virtual volume (S270: Yes), the resource association program 850 identifies the pool to which the virtual volume belongs and the Tier the virtual volume uses (S280).

To be more specific, the resource association program 850 refers to the pool column 1650 of the resource information table 750 in order to identify a pool to which the virtual volume belongs. Further, the resource association program 850 refers to the utilization columns 1660 to 1680 for each Tier of the resource information table 750 in order to identify the Tier which the volume uses. When a value of a Tier cell is greater than 0 GB, the Tier is being used by the volume.

The resource association program 850 identifies that the disk array (physical storage resource) which is allocated to each Tier as identified by the step S280 is the physical resource which stores the data of the virtual volume (S290). At this point, the identifier of the pool and the identifier of the Tier indicate the physical storage resource. The resource association program 850 may refer to the information (not illustrated) which associates Tiers with disk arrays, and identify a disk array corresponding with an identified Tier.

When the volume is not a virtual volume, that is, when the volume is a logical volume unrelated to any of the pools (S270: No), the resource association program 850 refers to the array column 1640 of the resource information table 750, and identifies the disk array (physical resource) from which the volume is cut (S300). The resource association program 850 associates the information indicating the physical storage resource identified by the step S290 and the step S300 with a job, and stores the same at the memory 754 (S310).

When an entire loop including the step S230 to the step S320 is completed, the resource association program 850 compares the physical storage resources identified by the step S250, the step S290, and the step S300 for each type (S330). According to the present example, the resource association program 850 compares the physical ports of the jobs, and further, compares the physical storage resources where job data are stored.

The resource association program 850 stores the comparison results from the step S330 at the memory 754, and returns the information concerning the jobs which may possibly use the same physical resource simultaneously, the physical resource, and the data storage area information of the mount destination of the host computer 110 where the physical resource is allocated to the simultaneously used resource identification program 800 (S340).

The comparison carried out at the step S330 will be described. When multiple jobs use a same physical port in one simultaneous execution job group, there is a possibility that the I/O load of the multiple jobs are imposed on the physical port. When the physical port is not being used by the multiple jobs, there is no load issue at the port. The resource association program 850 associates the identifiers of the multiple jobs using the same physical port with the identifier of the physical port, and stores the association at the memory 754.

In the current example, different types of volumes do not user the same physical storage resource. The resource association program 850 compares a virtual volume with another virtual volume, and compares a logical volume, which is different from a virtual volume, with another logical volume. In the comparison of the logical volumes, when the physical storage area of one disk array is allocated to various logical volumes, the resource association program 850 makes a determination that varied logical volumes use the same physical storage resource and that the physical storage resource may possibly be used in multiple jobs simultaneously.

The resource association program 850 determines, in the comparison of virtual volumes of various jobs, that, when the various volumes use the same pool and the same Tier, the jobs which use the virtual volumes use the same physical storage resource (disk array of the same Tier).

In the current example, various physical resources are allocated accordingly to various pools. Further, since the storage apparatus 130 is operable to change data allocation within a Tier, based on Tiers, the resource association program 850 is operable to make an appropriate determination concerning a simultaneous use of a physical resource.

On the other hand, when multiple jobs do not use the same pool, or when the multiple jobs use the same pool but use Tiers different from one another, the resource association program 850 determines that the multiple jobs do not use the same physical resource.

For example, in the resource information table 750 shown in FIG. 10, both the "VOL1" and the "VOL2" use the "Pool1." The "VOL1" uses 20 GB at Tier 0, while the "VOL2" does not use Tier 0. The disk arrays, which are allocated to the pools, are different per each Tier. Therefore, while the "VOL1" and the "VOL2" use the same pool, the "VOL1" and the "VOL2" do not use the disk array of Tier 0 simultaneously.

The "VOL1" uses 10 GB at Tier 1, while the "VOL2" uses 20 GB at Tier 1. Thus, the "VOL1" and the "VOL2" (jobs thereof) may possibly use the disk array of Tier 1 simultaneously. Therefore, the resource association program 850 stores, at the memory 754, the disk array of Tier 1 as the physical resource which may possibly be used simultaneously.

As stated above, the resource association program 850 indicates the disk array of a Tier by the identifier of the Tier and the pool of the Tier, or acquires the identifier of the disk array of the Tier by referring to information (not illustrated) which associates Tiers and disk arrays. For example, when a Tier includes a plurality of disk arrays, it is determined that all of the disk arrays are physical resource which may possibly be used simultaneously.

The above stated example determines that the virtual volume of various pools uses various physical storage resources. In another example, the physical storage resources of the virtual volumes of various pools are determined, and, by making a comparison amongst the same, it is determined whether the virtual volumes use the same physical storage resource.

The resource association program 850, as stated above, identifies the pool and the Tier used by each of various virtual volumes. The simultaneously used resource identification program 800 refers to the information which associates each Tier of each pool with a disk array, and identifies the disk array used by each of the various virtual volumes. For example, when the Tiers which may possibly be used simultaneously include a common disk array, the resource association program 850 determines that the disk array includes the physical storage resource which may possibly be used simultaneously.

Even when a pool of various identifiers are defined in a system, and the jobs which are executed simultaneously in a job net use the pool of various identifiers, a competition among physical resources at a storage apparatus may occur.

For example, when the pool of various identifiers is allocated to an array group, a competition of the physical resources occurs. In another example stated above, in such configuration, it is possible to more appropriately identify the physical storage resource which various jobs may possibly use simultaneously.

The resource information table 750 stores, at the utilization capacity columns 1660 to 1680 for each Tier, information of a point in time both in the future and in the past, such as a most recent measurement value. The resource association program 850 may estimate, by using the information of the resource monitoring information table 770, a utilization capacity for each Tier when executing a job net, and identify, by using the estimated value, the Tier which may possibly be used simultaneously.

For example, the resource association program 850 givens an instruction to the resource information management program 780 to acquire the monitoring information of a resource from the resource monitoring management program 1050 of the storage apparatus 130. The resource information management program 780 stores the acquired information at the resource monitoring information table 770.

The resource monitoring information table 770 indicates the utilization capacity of a virtual volume for each Tier on various dates and times (columns 2040 to 2060). The resource association program 850 checks the time variation of the utilization capacity for the virtual volume for each Tier. For example, a most recent utilization capacity for each Tier is compared with the utilization capacity of immediately therebefore. When there is no change in the utilization capacity of a Tier, the resource association program 850 uses the value of the resource information table 750 as the utilization capacity of the Tier.

When there is a change in the utilization capacity of a Tier, the resource association program 850 estimates the utilization capacity of the Tier when executing a job net. For example, the resource association program 850 calculates the amount of change per unit time concerning the most recent utilization capacity measured value of the Tier and the utilization capacity measured value therebefore. The resource association program 850 calculates the utilization capacity estimated value of the Tier as of the date and time when the job net is executed from the most recent utilization capacity measured value, date and time of the measurement, and date and time of the job net execution.

For example, suppose that the job net using the "VOL1" is executed at 11:00 of Jan. 15, 2013. The utilization capacities of Tier 0 of the "VOL1" at 9:00 of Jan. 15, 2013 and at 10:00 of Jan. 15, 2013 are 20 Gb and 10 GB, respectively. The resource association program 850 estimates, based on these values, that the utilization capacity of Tier 0 at 11:00 is 0 GB. The resource association program 850 estimates that the utilization capacity of Tier 1 at 11:00 is 30 GB by the same calculation method.

Another calculation method may be used for estimating the utilization capacities of Tiers. For example, another example of an estimation method includes acquiring utilization capacity measured values which continue to increase or decrease with respect to the most recent utilization capacity toward its past, and calculating the average value thereof. Further, the average value may be divided by the elapse time between the measurement date and time of the oldest measured value and the measurement date and time of the most recent. The value which is acquired by such method is used as the amount of change per time for the utilization capacity between the most recent measurement date and time and the job net execution date and time.

Figure 17:
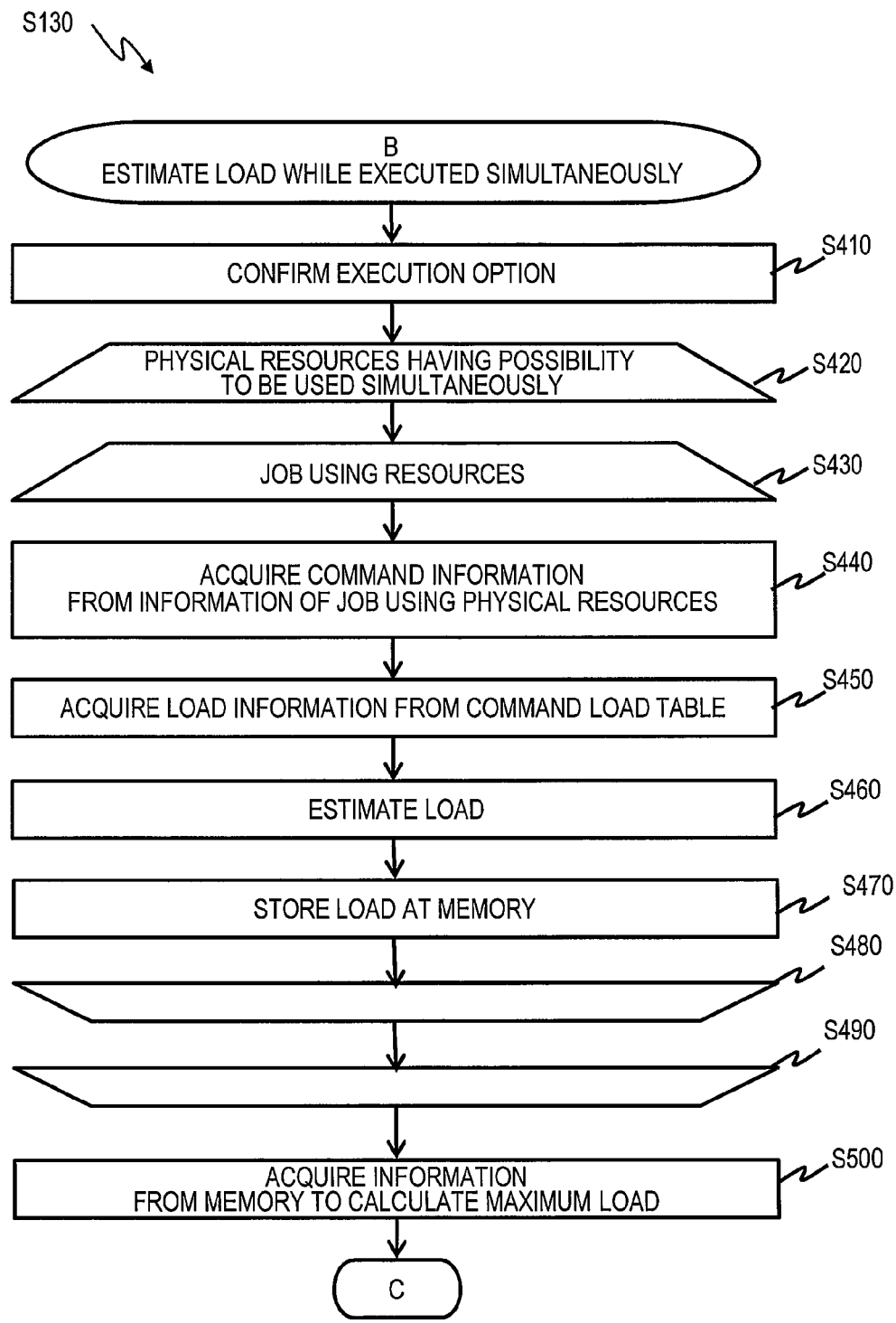
FIG. 17 illustrates an example of a flowchart showing details of a process to estimate a maximum load on a physical resource which may possibly be used simultaneously according to the present embodiment.

FIG. 17 illustrates a detailed flow of the step S130 in which a maximum I/O load is estimated regarding when the physical resources which may possibly be used simultaneously are used simultaneously. The load calculation program 860 receives an instruction from the simultaneously used resource identification program 800 and executes a process in accordance with the flowchart in FIG. 17.

The load calculation program 860 acquires a notification policy to a user from the policy information table 880, and verifies an execution option (S410). The notification policy may be defined as default information, or set by a user. When a user sets the notification policy, the user is operable to carry out the setting via a policy setting screen 2100 in FIG. 20 which will be described below. Details will be described below with reference to FIG. 20.

The load calculation program 860 executes the step S430 to the step S480 with respect to each of the physical resources which may possibly be executed simultaneously (S420, S490). The load calculation program 860 executes the step S440 to the step S470 with respect to each of the jobs which may possibly use the physical resources simultaneously (S430, S480).

The load calculation program 860 uses one selected (S420) physical resource, and acquires, from the execution file column 1330 of the job information table 810, one or a plurality of execution files of the job, which is selected (S430). The above stated one or the plurality of execution files may be identified by a procedure reverse from the above stated method where an execution file of a job is used to identify the physical resource used by the execution file.

When the plurality of execution files of the job use the physical resource, the load calculation program 860 acquires the identifier of all of the execution files. Further, the load calculation program 860, with respect to the identified execution file, acquires, from the execution file group 930 of the job, the command information which targets the physical resource (S440).

Next, the load calculation program 860 searches the command identified by the step S440 from the command load information table 850, and acquires a value for the IOPS of the command (S450). The load calculation program 860 estimates the I/O load the job imposes on the target physical resource (S460), and stores the estimated value at the memory 745 (S470).

For example, the load calculation program 860 estimates that the greatest IOPS value, among the IOPS values acquired by the step S450, as the I/O load the job imposes on the target physical resource. This is the largest I/O load the job is operable to impose on the target physical resource.

The load calculation program 860 is operable to estimate, with respect to the jobs which may possibly use one physical resource simultaneously, the I/O loads for all of the jobs that possibly use the physical resource simultaneously by repeating the step S440 to the step S470.

The load calculation program 860 is operable to estimate, with respect to all of the physical resources which may possibly be used simultaneously, the I/O loads for all of the jobs concerning each of all the physical resources which may be possibly be used simultaneously by executing the step S430 to the step S480.

The load calculation program 860 acquires estimated values of the I/O load for all the jobs of each physical resource from the memory 745, and estimates that the value obtained by adding the estimated values is the maximum I/O load to each physical resource (S500). The load calculation program 860 associates the maximum load estimated value for all of the physical resources which may possibly be used simultaneously with the physical resources, and returns the same to the simultaneously used resource identification program 800.

Figure 18:
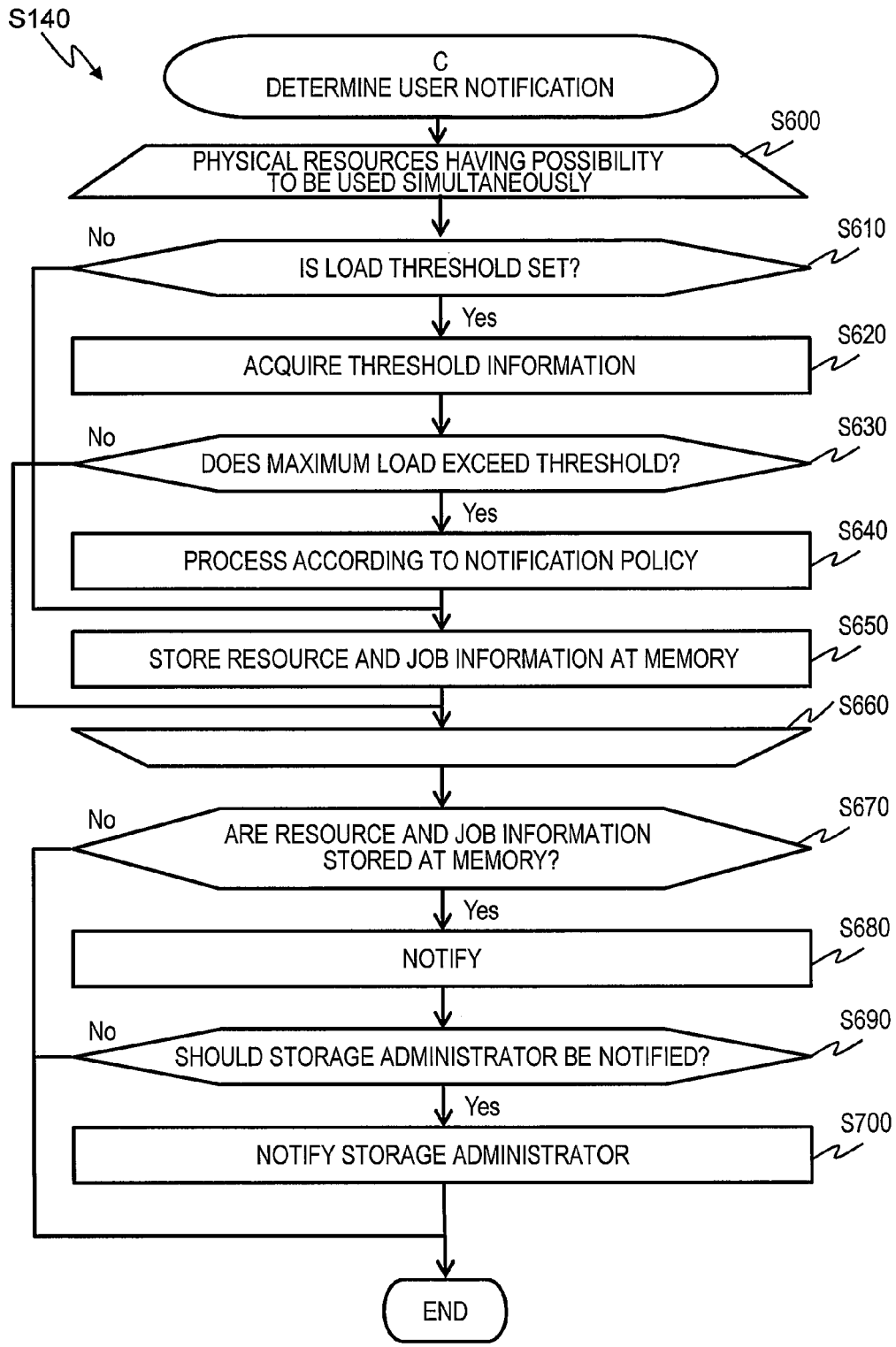
FIG. 18 illustrates an example of a flowchart of a process to make a determination concerning a notification to a user according to the present embodiment.

FIG. 18 illustrates a detailed flow of the step S140 in which a notification to a user is determined after a physical resource which may possibly be used simultaneously is identified. The simultaneously used resource identification program 800 executes a process in accordance with the flowchart in FIG. 18.

The simultaneously used resource identification program 800 repeats the step S610 to the step S650 with respect to the physical resources which have been determined to have a possibility to be used simultaneously (S600, S660).

The simultaneously used resource identification program 800 refers to the policy information table 880, and makes a determination as to whether a threshold is set, in a notification policy, with respect to the maximum load of the physical resource (S610). When there is no threshold set with respect to the maximum load of the physical resource (S610: No), the simultaneously used resource identification program 800 stores the information concerning the physical resources determined to have a possibility to be used simultaneously and the jobs which may possibly be executed simultaneously with respect to the physical resources at the identified result information table 890 (S650).

When there is a threshold set with respect to the maximum load (S610: Yes), the simultaneously used resource identification program 800 acquires the information concerning the set threshold (S620). A value for the threshold may be set as a default value, or set by a user. When a user sets the threshold, the policy setting screen of FIG. 20 which will be describe below is used. Details of FIG. 20 will be described below.

Next, the simultaneously used resource identification program 800 makes a determination as to whether the maximum load calculated at the step S520 exceeds the threshold acquired at the step S610 (S630). When the maximum load does not exceed the threshold (S630: No), the simultaneously used resource identification program 800 ends the process with respect to the target physical resources which may possibly be executed simultaneously, and moves onto a next physical resource (S660).

When the maximum load calculated at the step S520 exceeds the threshold acquired at the step S610 (S630: Yes), the simultaneously used resource identification program 800 executes the process in accordance with the notification policy (S640). The notification policy may be set as a default setting, or a user may set the notification policy. When a user sets the notification policy, the policy setting screen of FIG. 20 which will be describe below is used. Details of the notification policy will be described below.

By determining to notify or not to notify a user depending on a load on a physical resource, it becomes possible to notify the user only when a load on a physical resource is great such that an execution of a job net is greatly influenced thereby. By this, it becomes possible to avoid sending notification to the user concerning unnecessary information.

The simultaneously used resource identification program 800 stores the information concerning the physical resources determined to have a possibility to be used simultaneously and the jobs which may possibly be executed simultaneously with respect to the physical resources at the identified result information table 890 of the memory 745 (S650).

When the step S610 to the step S650 with respect to all the physical resources which may possibly be used simultaneously are completed, the simultaneously used resource identification program 800 determines whether or not the information is stored at the identified result information table 890 (S670). Note that when there is no physical resource which may possibility be used simultaneously for a target job net, or when I/O loads for all of the physical resources do not exceed the threshold (S670: No), no information is stored at the identified result information table 890. The simultaneously used resource identification program 800 ends the process without sending a notification.

When there is information stored at the identified result information table 890 (S670: Yes), the simultaneously used resource identification program 800 sends a verification result to a user such as a system administrator (S680). The information to be notified is displayed on a check result confirmation screen 2200 of FIG. 22 which will be described below. Details thereof will be described below.

When an instruction is received from a user to notify a storage administrator of the verification result as a result of the notification from the step S680 (S690), the simultaneously used resource identification program 800 notifies the storage administrator of the information which is stored at the identified result information table 890 (S700).

For example, the simultaneously used resource identification program 800 notifies a user such as a system administrator that there is a possibility that a job net may be prolonged or fail. The simultaneously used resource identification program 800 may inform a storage administrator of the information which may be deemed important for future procedures such as the information concerning a physical resource which may be affected (physical resource with a possibility to be used simultaneously), or the like, as well. When there is a storage resource which may be used for a target job operation, the simultaneously used resource identification program 800 may also automatically notify the storage administrator.

For example, when indicating a storage resource which is already allocated to the operation, and/or when indicating a storage resource which is not yet allocated commonly to any duties at the resource information table 750, the simultaneously used resource identification program 800 notifies the storage administrator of such resources.

FIG. 19 schematically illustrates an example of the policy setting screen which is used by a user to set a policy prior to executing the simultaneously used resource identification program 800. The policy, which is set, is stored at the policy information table 880. Accordingly, it becomes possible to appropriately provide notifications to each user by accepting a policy setting from the users.

For example, the policy setting screen 2100 allows a user to set an execution option 2110, a notification option 2120, an execution timing 2130, and a load threshold 2150. The user is operable to set an execution range for the simultaneously used resource identification program 800 via the setting column of the execution option 2110.

For example, the simultaneously used resource identification program 800 displays the policy setting screen 2100 at the output device 720 of the storage management computer 125. The host management computer 120 may also display the policy setting screen 2100 at the output device 630, and transmit input data to the storage management computer 125.

For example, a user is operable to choose a method of being notified after a verification on all jobs within a job net is completed, a method of being notified only of a resource having a high maximum I/O load among the physical resources which may possibly be executed simultaneously, or a method of being notified even for one physical resource which may be used simultaneously by multiple jobs which may possibly be executed simultaneously.

In a setting column of the notification option 2120, a user is operable to set an option concerning when a notification is given to a user such as a system administrator who sets the screen. For example, a user is operable to choose a setting in which a notification is not given automatically to a storage administrator, a setting in which a notification is given to a storage administrator when there is a storage resource, which is available additional allocation, or a setting in which a storage administrator is not given notifications ordinarily.

In a setting column of the execution timing 2130, it is possible to set at which timing the simultaneously used resource identification program 800 is executed. For example, it is possible to choose a setting in which the execution is carried out at a timing when the simultaneously used resource identification program 800 is informed that a job net is newly created at the host computer 110, or a setting in which the execution is carried out a fixed amount of time prior 2140 to the execution of the job net.

In a setting column of the load threshold 2150, a user is operable to carry out settings concerning the threshold of an I/O load which the load calculation program 860 uses. For example, a user is operable to set whether or not to have a threshold, or set a threshold 2160 for physical resources each having an I/O process performance different from one another. Further, the simultaneously used resource identification program 800 includes default values to which a user is operable to return when pressing a button 2170 in order to return to the default threshold values.

FIG. 20 schematically illustrates an example of a check result confirmation screen which is arranged for a user such as a system administrator to confirm a result notified by the simultaneously used resource identification program 800. On the check result confirmation screen 2200, a user, for example, confirms a notification content 2210, changes the notification content as needed, and presses a button 2220 which is arranged to notify a storage administrator.

The simultaneously used resource identification program 800 displays the check result confirmation screen 2200 at the output device 720 of the storage management computer 125. The host management computer 120 may receive necessary information from the simultaneously used resource identification program 800, and display the check result confirmation screen 2200 at the output device 630.

The notification content 2210 indicates, for example, a data and time when the simultaneously used resource identification program 800 notifies a user of the information concerning a physical resource which may possibly be used simultaneously, a target job net ID, a scheduled date and time when a target job net is executed, a content of check result, and a reason for the check result.

The content of check result indicates, for example, that there is a possibility that a job net may be prolonged or fail due to a phenomenon which may occur when multiple jobs access a physical resource simultaneously at the target job net. The reason for the check result indicates, for example, a possibility of multiple jobs, which make up a job net, accessing a single physical resource, an identifier of the jobs, a type of physical resources at the storage apparatus, and an identifier of the physical resource, or the like. The check result confirmation screen 2200 may indicate, along with the above stated information, the maximum I/O load as well. Information which may be needed by a user is appropriately displayed.

When it is determined, as a result of a user such as a system administrator confirming the notification content 2210, that a setting by the storage administrator for the storage apparatus is necessary, a user presses the button 2200 for notifying a storage administrator, for example. The identified result information table 890 is, in a manner linked with the notification content 2210, converted into information the storage administrator needs, and notified to the storage administrator.

As stated above, the present embodiment acquires the information of a job net, information concerning the job net and a job of the job net, and the resource information of a storage apparatus. The present embodiment identifies, by using the acquired information, a plurality of jobs which may possibly be executed simultaneously, and a plurality of physical resources which the plurality of jobs may possibly use simultaneously. Further, the present embodiment notifies a user of the information concerning I/O load on the identified physical resource. By this, the user is operable to grasp, prior to executing a job net, that there is a possibility that the job net may be prolonged, and prevent the prolonging of the job net before hand.

The present invention is not limited to the embodiment stated above, and includes various modifications. The present invention is applicable to a wide variety of computer systems which manage business operations utilizing storage apparatuses.

Although the above stated embodiment determines a possibility of simultaneous use regarding ports and physical resources, another example may determine a possibility of simultaneous use regarding physical resources other than the ports and the physical storage resources. For example, they are an interface concerning a controller board of a storage apparatus and a disk array.

The above-described examples are explained in details for better understanding of this invention and are not limited to those including all the configurations described above. A part of the configuration of one example may be replaced with that of another example; the configuration of one example may be incorporated to the configuration of another example. A part of the configuration of each example may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs for performing the functions. The information of programs, tables, and files to implement the functions may be stored in a storage device such as a memory, a hard disk drive, or an SSD (Solid State Drive), or a storage medium such as an IC card, or an SD card.

What is claimed is:

1. A management system managing a computer system including a host computer and a storage apparatus,
wherein the management system includes a processor, a memory, and an output device,
wherein the memory retains a first information on a job net defining an execution order of a plurality of jobs executed by the host computer,
wherein the memory retains a second information on an execution content of each of the plurality of jobs, and
wherein the memory retains a third information on an allocation relation between a plurality of storage areas at the host computer and a plurality of resources of the storage apparatus,
wherein the processor identifies, based on the first information, a plurality of jobs having a possibility to be executed simultaneously at the job net,
wherein the processor identifies, based on the second information, the plurality of storage areas at the host computer for storing therein data of the plurality of jobs having a possibility to be executed simultaneously,
wherein the processor identifies, based on the third information, the plurality of resources of the storage apparatus allocated to each of the plurality of identified storage areas,
wherein the processor determines a physical resource from the plurality of identified resources of the storage apparatus, allocated to at least two of the storage areas of the plurality of identified storage areas, is the physical resource having a possibility to be used simultaneously by at least two jobs, and
wherein the processor outputs the determined physical resource to the output device when the physical resource reaches a high load.

2. The management system according to claim 1,
wherein the storage apparatus includes a pool having a plurality of tiers allocated with a plurality of storage areas of the storage resources which are physical resources and have a plurality of performances each being different from one another, and
wherein the storage apparatus includes a plurality of virtual volumes allocated with the storage areas from the pool,
wherein the processor identifies, based on the third information, the plurality of virtual volumes allocated as at least a portion of the identified storage areas, and
wherein the processor identifies, based on the third information, the tiers used by each of the plurality of identified virtual volumes, and
wherein the processor determines a physical storage resource, allocated to one of the plurality of tiers of the pool used commonly by the plurality of virtual volumes allocated as the at least two of the storage areas, is the physical resource having a possibility to be used simultaneously.

3. The management system according to claim 2,
wherein the memory retains a fourth information on a change in capacity used by the plurality of virtual volumes at the plurality of tiers,
wherein the processor estimates, based on the fourth information, a capacity used by the plurality of identified virtual volumes at each of the plurality of tiers at a specific point in time in the future, and
wherein the processor identifies, based on a result of the estimation, the tiers used by each of the plurality of identified virtual volumes.

4. The management system according to claim 1,
wherein the processor determines that a physical port of the storage apparatus allocated to at least two of the storage areas is the physical resource having a possibility to be used simultaneously.

5. The management system according to claim 1,
wherein the processor acquires, from the third information, identifiers of a plurality of physical storage resources of the storage apparatus storing data of each of the identified storage areas, and
wherein the processor determines a physical storage resource storing data of the at least two of the storage areas of the plurality of identified storage areas is the physical resource having a possibility to be used simultaneously.

6. The management system according to claim 1,
wherein the memory retains a fifth information associating a command with a load,
wherein the processor identifies, based on the second information, a command of the jobs having a possibility to simultaneously access the physical resource having a possibility to be used simultaneously,
wherein the processor identifies, based on the fifth information, a load of each command,
wherein the processor decides, based on the identified load, a load on the physical resource having a possibility to be used simultaneously, and
wherein the processor outputs to the output device information of the physical resource having a possibility to be used simultaneously, of the jobs having a possibility to simultaneously access the physical resource having a possibility to be used simultaneously, and of the decided load of the physical resource.

7. The management system according to claim 1,
wherein the memory retains a fifth information associating a command with a load,
wherein the processor identifies, based on the second information, a command of the jobs having a possibility to simultaneously access the physical resource having a possibility to be used simultaneously,
wherein the processor identifies, based on the fifth information, a load of each command,
wherein the processor estimates, based on the identified load, a load on the physical resource having a possibility to be used simultaneously, and
wherein the processor outputs to the output device information of the physical resource having a possibility to be used simultaneously when the estimated load on the physical resource exceeds a threshold.

8. The management system according to claim 1,
wherein the management system further includes an input device, wherein the processor outputs a policy setting screen at the output device to allow a setting of a policy defining a method to output the determined physical resource, wherein the processor stores at the memory policy setting information inputted via the input device in accordance with the policy setting screen, and wherein the processor outputs the determined physical resource to the output device in accordance with the policy setting information.

9. A management method by a managing system managing a computer system including a host computer and a storage apparatus, the method comprising:

identifying, by the management system, based on a first information on a job net defining an execution order of a plurality of jobs executed by the host computer, a plurality of jobs having a possibility to be executed simultaneously at the job net;

identifying, by the management system, based on a second information on an execution content of each of the plurality of jobs, a plurality of storage areas at the host computer storing data of the plurality of jobs having a possibility to be executed simultaneously;

identifying, by the management system, based on a third information indicating an allocation relation between the plurality of the storage areas at the host computer and a plurality of resources of the storage apparatus, the plurality of resources of the storage apparatus allocated to each of the plurality of identified storage areas;

determining, by the management system, a physical resource from the plurality of identified resources of the storage apparatus allocated to at least two of the storage areas of the plurality of identified storage areas is the physical resource having a possibility to be used simultaneously by at least two jobs; and showing, by the management system, the determined physical resource when the physical resource reaches a high load.

10. The management method according to claim 9, wherein the storage apparatus includes a pool having a plurality of tiers allocated with a plurality of storage areas of the storage resources which are physical resources and have a plurality of performances each being different from one another, and wherein the storage apparatus includes a plurality of virtual volumes allocated with the storage areas from the pool, wherein the management method includes the management system identifying, based on the third information, the plurality of virtual volumes allocated as at least a portion of the identified storage areas, and wherein the management system identifies, based on the third information, the tiers used by each of the plurality of identified virtual volumes, and wherein the management system determines a physical storage resource, allocated to one of the plurality of tiers of the pool used commonly by the virtual volumes allocated as the at least two of the storage areas, is the physical resource having a possibility to be used simultaneously.

11. The management method according to claim 10, wherein the management system estimates, based on a fourth information on a change in capacity used by the plurality of virtual volumes at the plurality of tiers, a capacity used by the plurality of identified virtual volumes at each of the plurality of tiers at a specific point in time in the future, and wherein the management system identifies, based on a result of the estimation, the tiers used by each of the plurality of identified virtual volumes.

12. The management method according to claim 9, wherein the management system acquires, from the third information, identifiers of a plurality of physical storage resources of the storage apparatus storing data of each of the identified storage areas, and wherein the management system determines a physical storage resource storing data of the at least two of the storage areas of the plurality of identified storage areas is the physical resource having a possibility to be used simultaneously.

13. The management method according to claim 9, wherein the management system identifies, based on the second information, a command of the jobs having a possibility to simultaneously access the physical resource having a possibility to be used simultaneously, wherein the management system identifies, based on a fifth information associating a command with a load, a load of each command, wherein the management system decides, based on the identified load, a load on the physical resource having a possibility to be used simultaneously, and wherein the management system outputs to the output device information of the physical resource having a possibility to be used simultaneously, of the jobs having a possibility to simultaneously access the physical resource having a possibility to be used simultaneously, and of the decided load of the physical resource.

14. The management method according to claim 9, wherein the management system identifies, based on the second information, a command of the jobs having a possibility to simultaneously access the physical resource having a possibility to be used simultaneously, wherein the management system identifies, based on a fifth information associating a command with a load, a load of each command, wherein the management system estimates, based on the identified load, a load on the physical resource having a possibility to be used simultaneously, and wherein the management system outputs to the output device information of the physical resource having a possibility to be used simultaneously when the estimated load on the physical resource exceeds a threshold.

15. The management method according to claim 9, wherein the management system outputs a policy setting screen at the output device to allow a setting of a policy defining a method to output the determined physical resource, and wherein the management system outputs the determined physical resource to the output device in accordance with the policy setting information inputted from the input device in accordance with the policy setting screen.

* * * * *